United States Patent [19]
Fleek et al.

[11] Patent Number: 5,867,533
[45] Date of Patent: Feb. 2, 1999

[54] DIGITAL DELTA MODE CARRIER SENSE FOR A WIRELESS LAN

[75] Inventors: Arthur E. Fleek, Cary; William O. Camp, Jr., Chapel Hill; Michael J. Bracco, Raleigh, all of N.C.

[73] Assignee: International Business Machines Corporation, Armonk, N.Y.

[21] Appl. No.: 702,412

[22] Filed: Aug. 14, 1996

[51] Int. Cl.⁶ .......................... H04L 12/413; H04L 27/18
[52] U.S. Cl. .......................... 375/279; 375/326; 375/329; 370/445; 370/910
[58] Field of Search ................................. 375/279, 284, 375/324, 326, 329, 360; 370/445, 910

[56] References Cited

U.S. PATENT DOCUMENTS

| | | | |
|---|---|---|---|
| 3,987,422 | 10/1976 | Yanagidaira et al. | 340/870.18 |
| 4,208,740 | 6/1980 | Yin et al. | 375/249 |
| 4,866,737 | 9/1989 | Seifried | 375/238 |
| 5,122,758 | 6/1992 | Tomita | 329/304 |
| 5,206,881 | 4/1993 | Messenger et al. | 375/206 |
| 5,257,291 | 10/1993 | Desperben et al. | 375/329 |
| 5,337,335 | 8/1994 | Cloetens et al. | 375/376 |
| 5,388,125 | 2/1995 | Toda et al. | 375/332 |
| 5,436,591 | 7/1995 | Henze | 329/304 |
| 5,446,416 | 8/1995 | Lin et al. | 331/11 |
| 5,461,645 | 10/1995 | Ishii | 375/344 |
| 5,646,966 | 7/1997 | Chaki et al. | 375/368 |

*Primary Examiner*—Stephen Chin
*Assistant Examiner*—Jeffrey W. Gluck
*Attorney, Agent, or Firm*—John D. Flynn; Morgan & Finnegan

[57] ABSTRACT

An apparatus and a method for detecting a carrier signal of a phase shift keyed modulated signal. A first counter circuit generates a plurality of counts, with each count being a number of cycles of a reference frequency signal occurring between two consecutive rising edges of an intermediate frequency signal. A comparison circuit compares a first count of reference frequency cycles to a second count of reference frequency cycles when a difference between an initial count of reference frequency cycles and a first predetermined number is less than a second predetermined number. The first predetermined number represents a time period of one cycle of the nominal center frequency, and the first count and the second count respectively represent time periods of first and second cycles of a pair of consecutive cycles of the intermediate frequency signal. The comparison circuit generates a difference signal when a difference between the first count and the second count is less than a third predetermined number. A second counter circuit counts cycles of the intermediate frequency signal and generates a carrier detect signal when a count of the intermediate frequency signal cycles equals a fourth predetermined number.

35 Claims, 19 Drawing Sheets

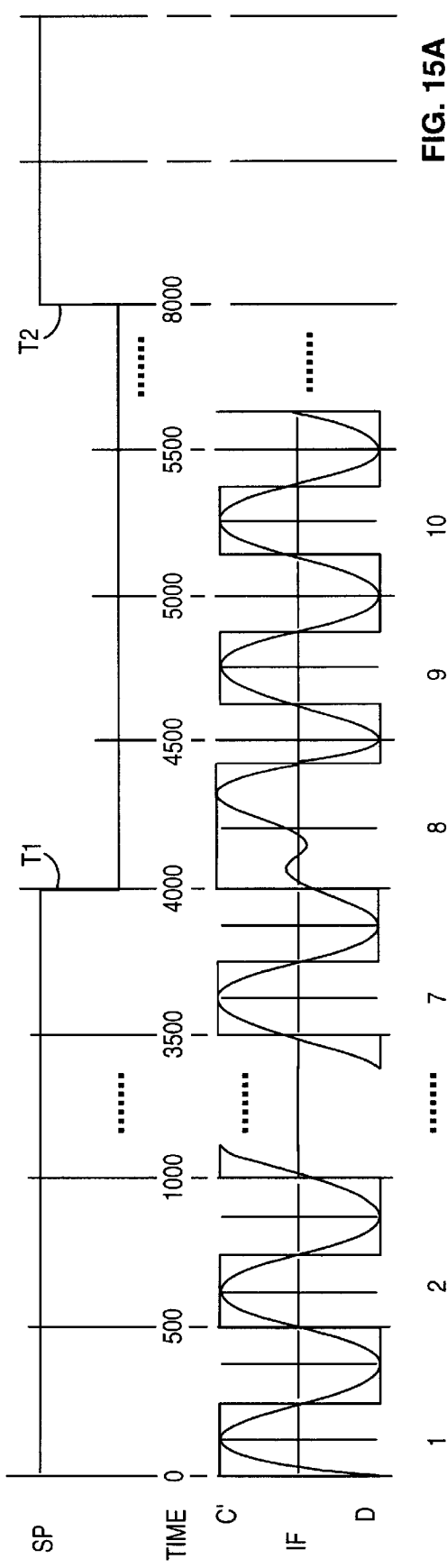
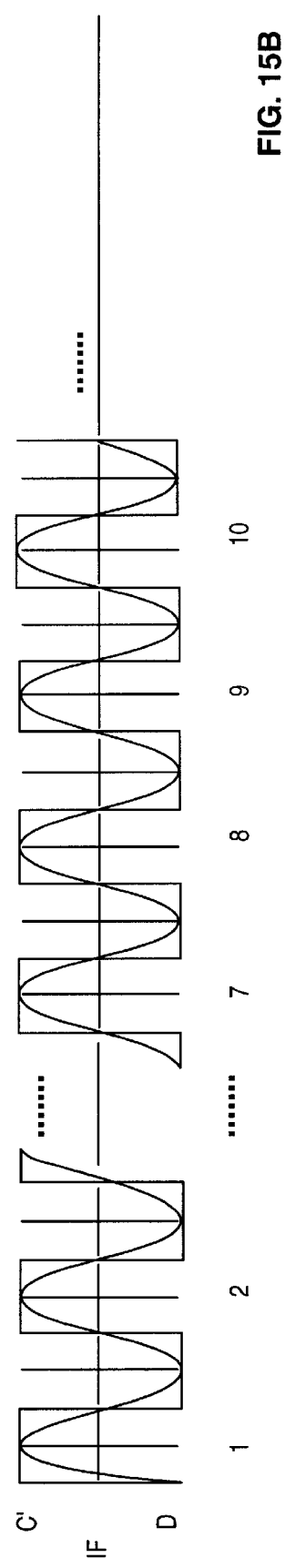

DIGITAL DELTA MODE CARRIER SENSE FOR A WIRELESS LAN

FIELD OF THE INVENTION

The present invention broadly relates to data processing systems. More particularly, the present invention relates to digital input/output systems for communication over a radio medium.

BACKGROUND OF THE INVENTION

Phase shift key (PSK) modulation of radio signals has been used in the past to transmit digital information between data processing systems. One example is shown in U.S. Pat. No. 5,150,070, entitled "Demodulator for biphase, suppressed-carrier PSK signals" by P. Rinaldi. The phase modulation technique uses a 180 degree phase shift to distinguish between a binary one and a binary zero. This forces the carrier to be zeroed-out during modulation. To demodulate the modulated signal, the prior art requires complex circuitry to reliably reconstitute the binary information at the receiver. The demodulators of the prior art must reconstruct the carrier. They require coherent demodulation to create a signal that is phase locked with the incoming signal, and they then must combine the two in a multiplier to detect the data. Consequently, the IF signal must be made synchronous with the demodulated signal off the carrier. Stated otherwise, the carrier and the local oscillator must be made synchronous to demodulate the PSK signal.

In phase shift key modulation, a carrier signal, for example a 2.4 GHz carrier signal, is selectively applied to a phase shift delay circuit, depending upon the binary state of control input to the delay circuit. For example, when there is a binary zero data state for the control input, no phase shift delay is applied to the carrier signal. Alternately, when there is a binary one data state, a phase shift delay is applied to the carrier signal. The carrier signal is then transmitted to the receiver. At the receiver, there is a local oscillator that oscillates at a slightly different frequency, for example 2.4 GHz plus 2 MHz. At the receiver, these two frequencies are mixed and a corresponding beat note signal, or intermediate frequency (IF) signal, is produced. Phase shift information, which has been imposed on the carrier signal, is then manifested in the IF signal at the receiver. A significant problem in such phase shift key modulation communication techniques is created by the drift in the frequency of the oscillator at the transmitter which generates the 2.4 GHz carrier signal, and the drift of the local oscillator at the receiver which generates the 2.4 GHz plus 2 MHz signal. The relative drift in the frequencies of these two oscillators results in unstable characteristics in the intermediate frequency produced at the receiver and, therefore, unreliable detection of the binary data being transmitted.

U.S. Pat. No. 5,561,689, filed Oct. 26, 1994, by Fleek et al., discloses a phase demodulation technique for wireless LAN that allows the carrier and the local oscillator to not be synchronous. A PSK modulated signal received at a receiving station is amplified by a limit amplifier to form a square wave signal having pulses of uniform height. To detect a carrier sense condition, the time between the rising edges of the square wave IF signal that occur in response to the modulation at the transmitter are detected using a counter during a carrier sense measurement window. Times between the like edges of the square wave signal that are shorter than normal for an unmodulated IF signal indicate a first binary value of the modulation. Longer than normal times between the like edges of the square wave IF signal indicate a second binary value.

To compensate for drift in the carrier and in the local oscillator frequencies, the nominal non-phase transition portions of the IF signal are periodically sampled and corresponding registers are updated. Nevertheless, for a reliable carrier sense indication the IF frequency of the receiving station is required to be constant for a large number of cycles. This requirement greatly constrains the difference in crystal references between the transmitting and receiving stations and makes the measurement window for detecting a carrier sense indication relatively large. Other factors associated with this particular approach that contribute to the requirement of a large measurement window are, for example, the phase noise of the voltage controlled oscillator (VCO) of the local oscillator (LO), and variations in the LO frequency that are caused by the phase locked loop (PLL) not being completely settled. By making carrier sense measurement window sufficiently large to allow for these factors, this particular technique occasionally provides false carrier sense indications, adversely affecting the reliability of the collision avoidance algorithm provided by the Media Access Control layer of the wireless LAN system. For example, after a crier sense condition is active, the measurement window is expanded to allow for the variations in the IF that are caused by the Phase Shift Modulation. As a result, a carrier sense indication occasionally remains active after transmission of a data frame is complete.

What is needed is a demodulation technique that permits the crystal references at both the transmitting and receiving stations of a wireless network to have a greater frequency tolerance, %hat prevents slow changes in the LO caused by PLL settling time to adversely affect carrier sense indications, and that reliably senses the end of a data frame and loss of the carrier.

OBJECTS OF THE INVENTION

It is an object of the invention to provide a wireless local area network that has a more reliable and accurate reception of digital transmissions from a sending node, than has been available in the prior art.

It is another object of the invention to provide a wireless local area network that has a better carrier signal detection than has been available in the prior art.

It is another object of the invention to provide a wireless local area network in which a carrier sense condition is detected based on a minimum change from cycle to cycle of the carrier signal.

It is another object of the invention to permit the crystal references at both the transmitting and receiving stations of a wireless network to have a greater frequency tolerance.

It is another object of the invention to prevent slow changes in the LO caused by PLL settling time to adversely affect carrier sense indications.

It is another object of the invention to reliably sense the end of a data frame and loss of the carrier.

SUMMARY OF THE INVENTION

These and other objects, features and advantages are accomplished by the present invention. In that regard, the present invention provides an apparatus for detecting a carrier signal of a phase shift keyed modulated signal representing a binary signal. The apparatus is typically part of a receiving node that is associated with a sending node in a wireless local area network. According to the invention, the apparatus includes an intermediate frequency generator, an edge detecting circuit, a first counter circuit, a comparison circuit, a second counter circuit and a media access control device. The intermediate frequency generator receives a phase shift keyed modulated signal and generates an intermediate frequency signal having rising and falling edges and a nominal center frequency. The edge detecting circuit is coupled to the intermediate frequency signal and detects consecutive rising and falling edges of the intermediate frequency signal, where two consecutive rising edges represent a time period of a cycle of the intermediate frequency signal. Similarly, two consecutive falling edges represent a time period of a cycle of the intermediate frequency signal. The first counter circuit is responsive to the edge detecting circuit by generating a plurality of counts, such that each count is the number of cycles of a reference frequency signal that occur between two consecutive rising edges. The comparison circuit is responsive to the first counter circuit by comparing a first count of reference frequency cycles to a second count of reference frequency cycles when a difference between an initial count of reference frequency cycles and a first predetermined number is less than a second predetermined number. According to the invention, the first predetermined number represents a time period of one cycle of the nominal center frequency, and the second predetermined number preferably corresponds to about 50 ns. The first and second counts respectively represent time periods of first and second cycles of a pair of consecutive cycles of the intermediate frequency signal. Of the first and second counts, at least the second count occurs subsequent to the initial count. That is, the first count and the initial count may be identical. Preferably, the comparison circuit compares the first count to the second count when the initial count falls within a predetermined range of numbers, with the predetermined range of numbers corresponding to a range of time periods related to one time period of the nominal center frequency. The comparison circuit then generates a difference signal when a difference between the first count and the second count is less than a third predetermined number that preferably corresponds to about 36 ns. The second counter circuit is responsive to the difference signal by counting cycles of the intermediate frequency signal and generates a carrier detect signal when a count of the intermediate frequency signal cycles equals a fourth predetermined number that preferably corresponds to about 74 cycles. The media access control device is responsive to the carrier detect signal by disabling the sending node associated with the receiving node from transmitting a signal.

According to the invention, the edge detecting circuit includes a limit amplifier that generates a square wave pulse signal having rising and falling edges and that corresponds to the intermediate frequency signal. The edge detecting circuit detects consecutive rising edges and consecutive falling edges of the square wave pulse signal. The comparison circuit includes a storage circuit, a decoder circuit and an adder circuit. The storage circuit is coupled to the first counter circuit and stores the first and second counts representing the respective time periods of the first and second cycles of a pair of consecutive cycles of the intermediate frequency signal. The decoder circuit is coupled to the storage circuit and outputs a first signal when the initial count of cycles is less than the second predetermined number. The second counter circuit is responsive to the first signal by resetting the count of cycles of the intermediate frequency signal. The adder circuit is coupled to the storage circuit and outputs the difference signal when the difference between the first and second counts is less than the third predetermined difference.

The invention also includes a third counter circuit, a data output circuit and a frequency compensation circuit. The third counter circuit is responsive to the edge detecting circuit by generating a plurality of counts, such that each count counted by the third counter circuit is a number of cycles of the reference frequency signal occurring between two consecutive falling edges. The data output circuit is responsive to the respective counts of the first and third counter circuits by generating an output signal that is a composite representation of the binary signal. The frequency compensation circuit outputs a frequency compensation signal when the second counter circuit generates the carrier detect signal. Preferably, the frequency compensation signal is related to a difference between a time period of a cycle of the intermediate frequency signal and a time period of one cycle of the nominal center frequency. The first and third counter circuits are coupled to the frequency compensation signal, and the first and third counter circuits each output a plurality of counts that are offset by the frequency compensation signal.

After the carrier detect signal is generated, the comparison circuit compares a third count of cycles of the reference frequency counted by the first counter circuit to the first predetermined number. The comparison circuit then terminates the difference signal when a difference between the third count and the first predetermined number equals a fifth predetermined number that preferably corresponds to about 55 ns. The second counter circuit is responsive to termination of the difference signal by counting cycles of the intermediate frequency signal and terminating the carrier detect signal when a count of the intermediate frequency signal cycles equals a sixth predetermined number that preferably corresponds to about 5 cycles of the intermediate frequency signal. The media access control device is responsive to termination of the carrier detect signal by enabling the associated sending node for transmitting a signal.

The present invention also provides a wireless local area network that includes a first node having a transmitting device that transmits a phase shift keyed modulated signal that represents a binary signal, and a second node having a transmitting device and a receiving device that receives the signal transmitted by the first node. The receiving device of the second node includes an intermediate frequency generator, a carrier detection circuit, a cycle-to-cycle difference circuit, a cycle difference counter circuit, a media access control device, a demodulator circuit and a frequency compensation circuit. The intermediate frequency generator generates an intermediate frequency signal corresponding to the received signal. The carrier detection circuit is coupled to the intermediate frequency generator and measures a time period of a cycle of the intermediate frequency signal. The carrier detection circuit generates a first detection signal when a difference between the measured time period and a nominal time period of the intermediate frequency signal is less than a first predetermined difference that preferably corresponds to about 50 ns. The cycle-to-cycle difference circuit measures a difference in time periods of two consecutive cycles of the intermediate frequency signal and generates a valid difference signal when the difference is less than a second predetermined difference that preferably corresponds to about 36 ns. The cycle difference counter circuit is responsive to the first detection signal and the valid difference signal by counting cycles of the intermediate frequency signal and by generating a carrier detect signal when a count of the intermediate frequency signal cycles equals a first predetermined number that preferably corresponds to about 74 cycles of the intermediate frequency signal.

The media access control device disables the transmitting device of the second node from transmitting a signal when the carrier detect signal is generated. The demodulator circuit generates a composite output signal corresponding to the binary signal when the carrier detect signal is generated. The frequency compensation circuit is responsive to the carrier detect signal by generating a frequency compensation signal that is preferably related to a difference between a time period of a cycle of the intermediate frequency signal and a time period of one cycle of the nominal center frequency.

According to the invention, the carrier detection circuit includes a memory circuit that stores measured time periods of two consecutive cycles of the intermediate frequency signal, and a decoder circuit that generates the first detection signal when the difference between one of the stored measured time periods and the nominal time period of the intermediate frequency signal is less than the first predetermined difference. The memory circuit is coupled to the frequency compensation signal and the measured time periods of the two consecutive cycles of the intermediate frequency signal are compensated by the frequency compensation signal. The cycle-to-cycle difference circuit includes an adder circuit that is coupled to the memory circuit and outputs the valid difference signal when the difference between the two stored measured time periods is less than the second predetermined difference. The decoder circuit terminates the first detection signal when the difference between the one of the stored measured time periods and the nominal time period of the intermediate frequency signal equals the first predetermined difference. The cycle difference counter circuit is responsive to termination of the first detection signal by resetting the count of the cycles of the intermediate frequency signal.

After the carrier detect signal is generated, the cycle-to-cycle difference circuit measures a difference between a time period of a cycle of the intermediate frequency signal and the nominal time period of the intermediate frequency signal, and generates a valid difference signal when the difference is less than a third predetermined difference and terminates the valid difference signal when the difference equals the third predetermined difference. The cycle-to-cycle difference circuit is responsive to termination of the valid difference signal by counting cycles of the intermediate frequency signal and by terminating the carrier detect signal when a count of the intermediate frequency signal cycles equals a second predetermined number. Preferably, the third predetermined difference corresponds to about 55 ns, and the second predetermined number corresponds to about 5 cycles of the intermediate frequency signal. The media access control device is responsive to termination of the carrier detect signal by enabling the transmitting device of the second node for transmitting a signal.

The present invention also provides a method of detecting a carrier signal of a phase shift keyed modulated signal. The method includes the steps of generating an intermediate frequency signal from a received phase shift keyed modulated signal, with the intermediate frequency signal having a nominal center frequency; determining a difference between a time period of a first cycle of the intermediate frequency signal and a time period of one cycle of the nominal center frequency; determining a first difference between cycle time periods of each cycle for each pair of consecutive cycles of the intermediate frequency signal for a first predetermined number of consecutive cycles of the intermediate frequency signal when the determined difference between the time period of the first cycle of the intermediate frequency signal and the time period of one cycle of the nominal center frequency is less than a predetermined period of time, with the consecutive cycles being subsequent to the first cycle; and generating a carrier detect signal when the first difference between cycle time periods of each cycle for each pair of the first predetermined number of consecutive cycles of the intermediate frequency signal is less than a first predetermined cycle time period difference. Preferably, the first predetermined number of consecutive cycles is about 74 consecutive cycles, the predetermined period of time is about 50 ns, and the first predetermined cycle time period difference is about 36 ns. Transmission of a signal is disabled when the carrier detect signal is generated.

According to the invention, the step of generating an intermediate frequency signal includes the step of forming a square wave pulse signal from the received signal, that represents a binary signal, such that the square wave pulse signal has rising and falling edges. Additionally, the step of determining the difference between the time period of the first cycle of the intermediate frequency signal and the time period of one cycle of the nominal center frequency includes the steps of detecting first and second consecutive rising edges of the square wave pulse signal, with the first and second consecutive rising edges representing the first cycle of the intermediate frequency signal; measuring a first number of periods of a first predetermined frequency signal occurring between the first and second rising edges, with the first number representing the time period of the first cycle; and comparing the fist number with a predetermined number that preferably represents the time period of one cycle of the nominal center frequency.

The step of determining the first difference between cycle time periods of each cycle for each pair of consecutive cycles of the intermediate frequency signal includes the steps of detecting third and fourth consecutive rising edges of the square wave pulse signal, with the third and fourth consecutive rising edges representing a first cycle of a pair of consecutive cycles of the intermediate frequency signal; measuring a second number of periods of the first predetermined frequency signal occurring between the third and fourth rising edges, with the second number representing the time period of the first cycle of the pair of consecutive cycles; detecting a fifth rising edge of the square wave pulse signal, the fifth rising edge being consecutive to the fourth rising edge, such that the fourth and fifth consecutive rising edges represents a second cycle of the pair of consecutive cycles; measuring a third number of periods of the first predetermined frequency signal occurring between the third and fourth rising edges, with the third number representing the time period of the second cycle of the pair of consecutive cycles; and determining a difference between the second number and the third number. Preferably, the first and second rising edges are the third and fourth rising edges, respectively, such that the first cycle of the intermediate frequency signal is the first cycle of the pair of consecutive cycles.

The received signal is demodulated to generate an output signal that is a composite representation of the binary signal when the carrier detect signal is generated. The received signal is demodulated by measuring first time intervals between consecutive rising edges of the square wave pulse signal; measuring second time intervals between consecutive falling edges of the square wave pulse signal; and generating the output signal based on results of the first and second time interval measurements. The method of the invention also includes the steps of measuring a cycle time period of a second cycle of the intermediate frequency signal when the cycle time period difference for each pair of the first predetermined number of consecutive cycles is less than the first predetermined cycle time period difference, such that the second cycle is subsequent to the first predetermined number of consecutive cycles; generating a frequency compensation factor based on the measured second cycle time period; and compensating the first and second time intervals measurements for cycle time period deviations of the intermediate frequency signal from the cycle time period of the nominal center frequency using the frequency compensation factor.

The method of the invention also includes the steps of determining a second difference between cycle time periods of each cycle for each pair of consecutive cycles of the intermediate frequency signal for a second predetermined number of consecutive cycles of the intermediate frequency signal after the carrier detect signal is generated; and terminating the carrier detect signal when the second difference between cycle time periods of each cycle for each pair of the second predetermined number of consecutive cycles of the intermediate frequency is less than a second predetermined cycle time period difference. Preferably, the second predetermined number of consecutive cycles is about 5, and the second predetermined cycle time period difference is about 55 ns.

DESCRIPTION OF THE FIGURES

These and other objects, features and advantages will be more fully appreciated with reference to the accompanying figures.

FIG. 15A is a waveform diagram of the intermediate frequency signal D which is modulated by the spoiler signal SP.

FIG. 15B is a waveform diagram of signal D for the intermediate frequency after the spoiler signal SP no longer modulates the carrier signal.

DISCUSSION OF THE PREFERRED EMBODIMENT

Figure 1A:
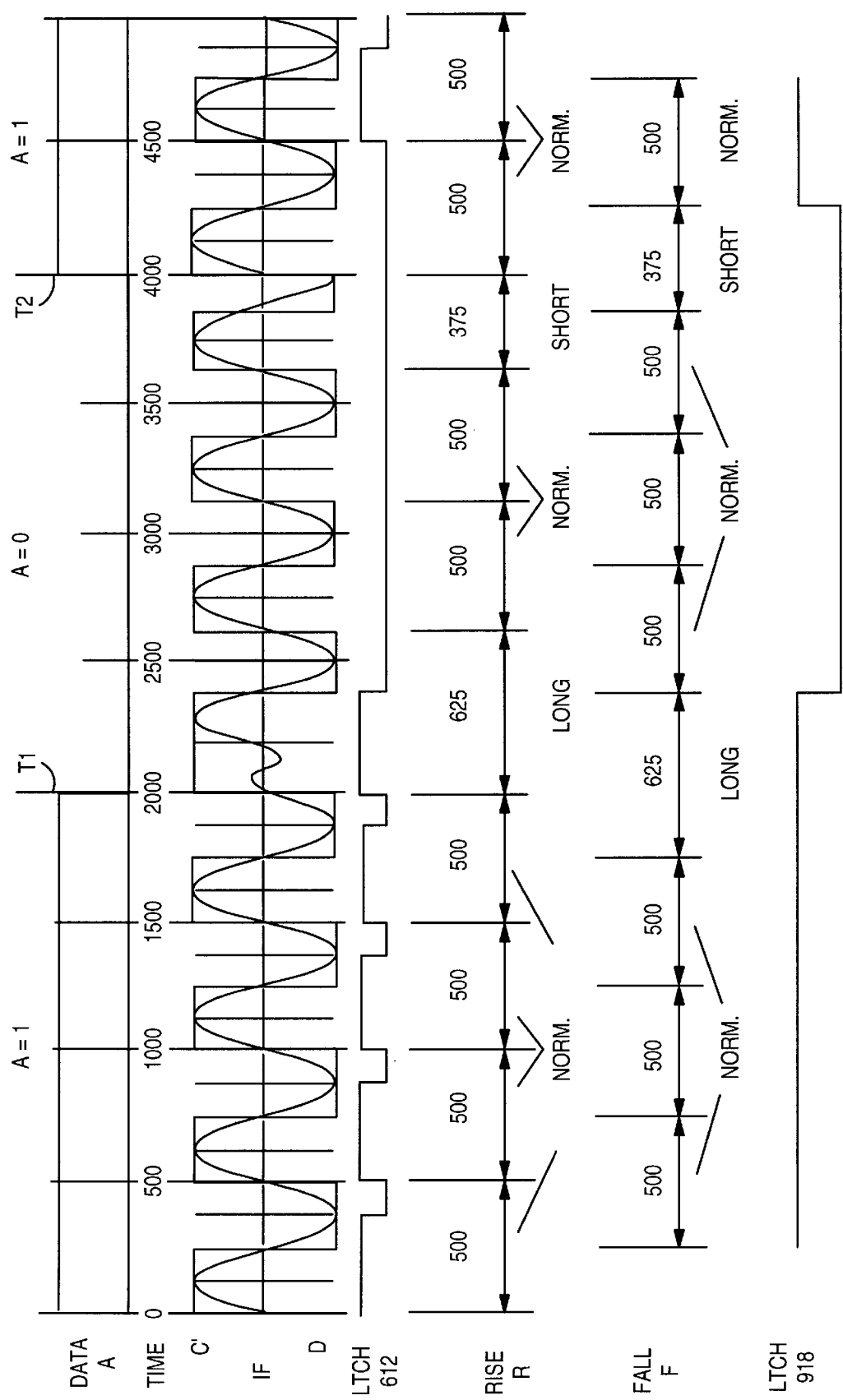
FIG. 1A is a waveform diagram of the intermediate frequency (IF) demodulation.

The waveform diagram of FIG. 1A illustrates a 0.5 megabit per second data rate waveform A showing a binary state 1 (A=1) interval which ends at the time T1 with a transition from a binary 1 to a binary 0 state. The time in nanoseconds is shown along the abscissa of the waveform and it is seen that at 2000 nanoseconds, the T1 event occurs. After time T1 and before time T2, the data waveform is in a binary 0 state (A=0). At the instant T2, a transition from binary 0 to binary 1 occurs with A=1.

Figure 2:
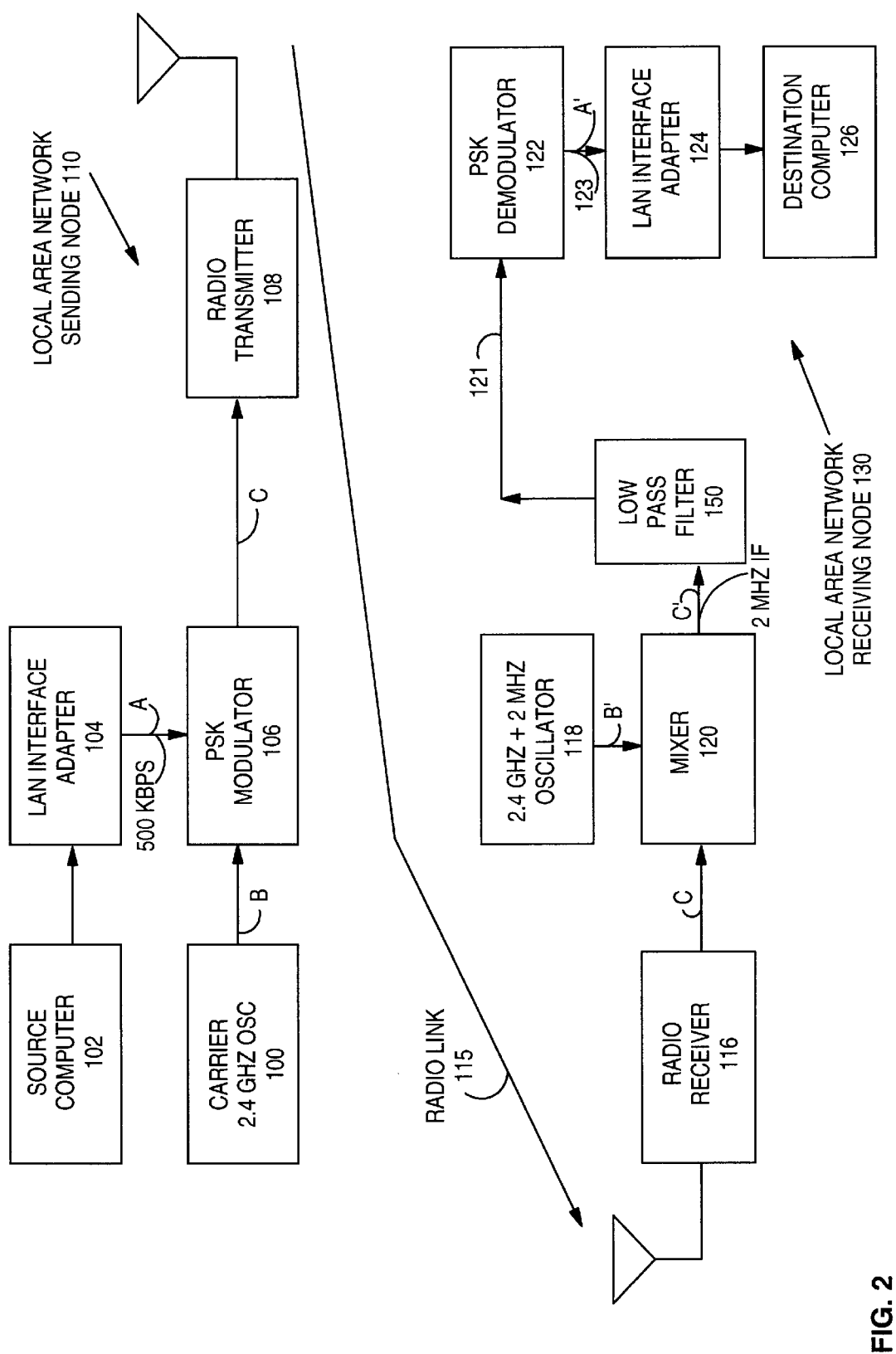
FIG. 2 is a functional block diagram of the local area network, including the sending node and the receiving node, in accordance with the invention.

Reference can be made to the system block diagram of FIG. 2 which illustrates how the transmitter at the local area network sending node 110 transmits the information in the data waveform A. A source computer 102 outputs binary digital information to the local area network interface adapter 104, which outputs a 500 Kbps binary data stream A. The data rate for the binary data stream A can have other values up to ½ of the IF frequency D in FIG. 1A. Thus, if the IF frequency is higher, for example at 20 MHz, then the data rate can have any value up to 10 megabits per second, for example. A 2.4 GHz oscillator 100 generates the carrier signal B. The carrier signal B is applied to the phase shift key (PSK) modulator 106. The control signal which is the binary signal A is applied to the modulator 106. Modulation occurs when the waveform A transitions from the binary A=1 to binary A=0 at the time T1; a phase shift delay is applied to the carrier signal B. Alternately, when the data waveform A transitions from a binary value A=0 to a binary value A=1 at time T2, the phase shift delay is removed from the carrier signal B. This modulated carrier signal is then applied as signal C to the radio transmitter 108 at the local area network sending node 110. An electromagnetic radio wave 115 is transmitted from the transmitter 108 to the radio receiver 116 at the local area network receiving node 130 in FIG. 2. The receiver 116 then outputs the waveform C to the input of the signal mixer 120. The local oscillator 118 at the receiving node 130, has a frequency of 2.4 GHz+2 MHz. The local oscillator at the receiving node could also have a frequency of 2.4 GHz–2 MHz, for example. The local oscillator signal B' is applied to the other input to the mixer 120, resulting in a heterodyned beat signal C' which is the 2 MHz intermediate frequency signal. The 2 MHz intermediate frequency signal at C' is applied to a low pass filter 150 whose output 121 is then applied to the PSK demodulator 122. The demodulator 122 is shown in greater detail in FIG. 3. The output of the demodulator 122 is a binary data stream A' which is the reconstructed data stream A which was applied to the input of the modulator 106 at the sending node 110. The output of the demodulator 122 on line 123 is applied to the local area network interface adapter 124 and then to the destination computer 126 at the local area network receiving node 130.

Figures 2A, 2B:
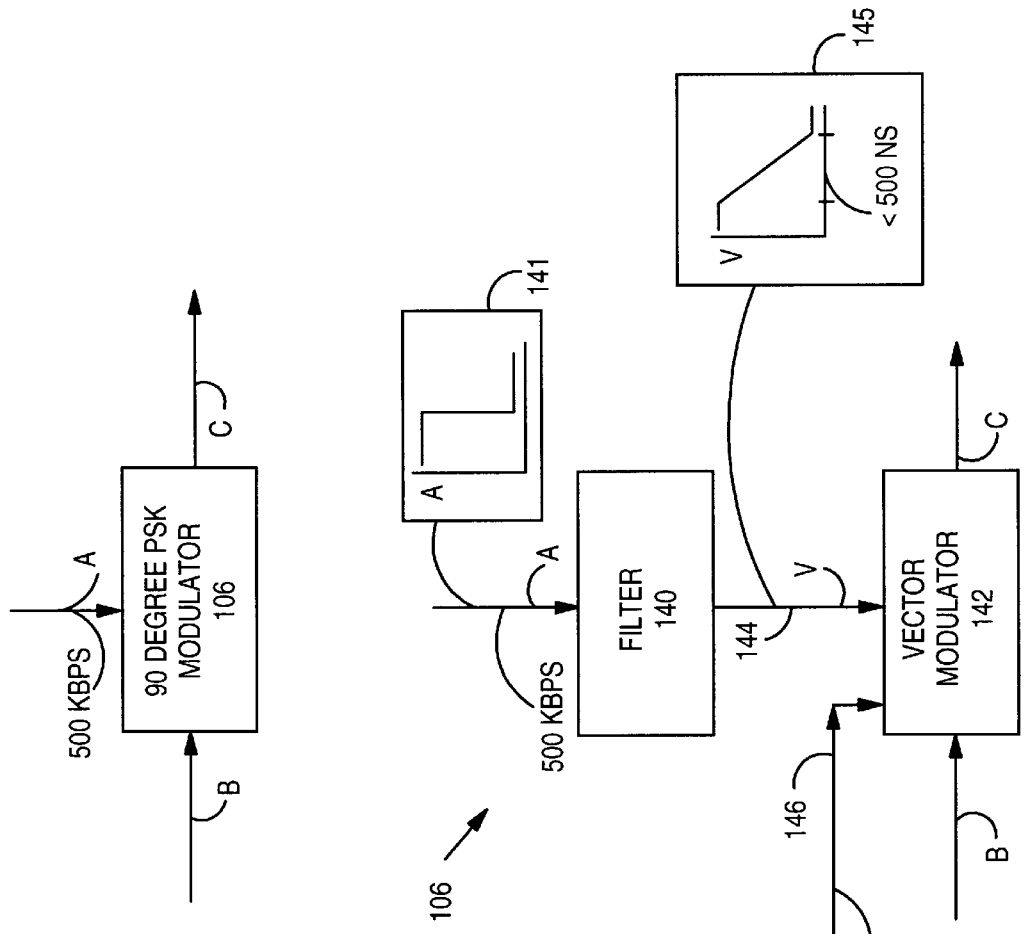
FIG. 2A shows an alternate embodiment of the modulator 106, with a fixed phase shift value of 90°.
FIG. 2B shows the preferred embodiment of the modulator 106, which uses an adjustable phase shift value which is set at 122° phase shift.

FIG. 2A shows an embodiment for the modulator 106, wherein a 90° phase shift is applied when the binary signal A transitions from a binary value of one to a binary value of zero. Alternately when the data waveform A transitions from a binary value of zero to a binary value of one, the phase shift delay is removed from the carrier signal B. Inspection of the waveform diagram A in FIG. 1A will show that the transition from the binary one to the binary zero is substantially instantaneous. When a 90° phase shift is applied to the carrier signal B during an extremely small interval, undesirable harmonic frequencies are generated which make the design difficult to comply with the Federal Communications Commission Part 15 spectral requirements.

FIG. 2B shows the preferred embodiment for the modulator 106, and the best mode of the invention, with the phase angle for the phase shift having a value of 122°, applied over an interval less than, but approximately equal to the period of the intermediate frequency of 500 nanoseconds. In FIG. 2A, the modulator 106 is designed to apply the phase shift over a duration which is less than and approximately equal to the intermediate frequency period of 500 nanoseconds. In order to increase the detectability of the phase shift signal at the receiver, the magnitude of the phase shift angle is increased from 90° up to 130°. Phase shift magnitudes from 90° to 130° are found to work well. The best mode for the phase shift angle is found to be 122°. The modulator 106 of FIG. 2B accomplishes the phase modulation as follows. The binary signal A is applied to the input of the filter 140, which is a low pass filter. The filter 140 includes a notch filter at 0.75 MHz, to suppress undesirable harmonics. The output of the filter 140, is applied on line 144 to the input of the vector modulator 142. The wave form V for the output on line 144 from the filter 140, is shown in the waveform 145. It is seen in the waveform 145 shown in FIG. 2B, that the duration over which the binary value of the signal A changes from a binary one to binary zero, is approximately 500 nanoseconds, which is the intermediate frequency. This is compared with the waveform 141 shown in FIG. 2B for the binary waveform A input to filter 140. The vector modulator 142 has an adjustable input 146 which allows the setting of the maximum value for the phase angle to be applied by the vector modulator 142 to the carrier signal B. Settings for the maximum value phase angle 146 can be fixed from 90° to 130° and a satisfactory modulated carrier signal C can be obtained. In the best mode of the invention, the setting for the maximum value phase angle 146 is found to be a value of 122 degrees.

Figure 1B:
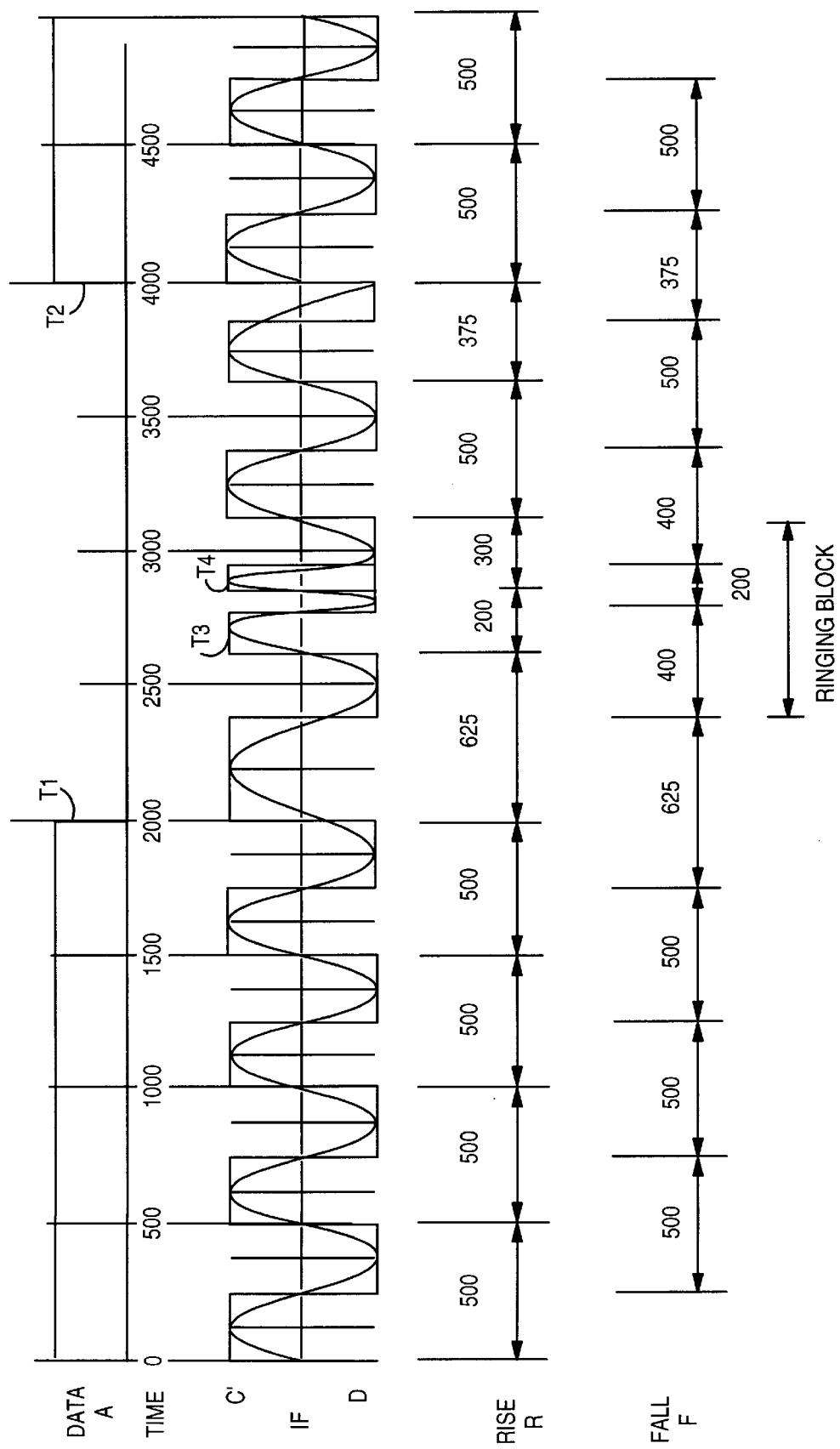
FIG. 1B is a waveform diagram illustrating the digital filtering in the demodulator of the invention.

Returning to FIG. 1A, it can be seen that the intermediate frequency signal C' output from the mixer 120 in FIG. 2 is an approximately 2 MHz sinewave signal whose phase is modulated by the 500 Kbps digital signal A. The modulation shown for FIGS. 1A and 1B is instantaneous 90° phase shift when the binary data A transitions from a binary one to a binary zero. This is done to simplify the illustration of the invention.

Figure 3:
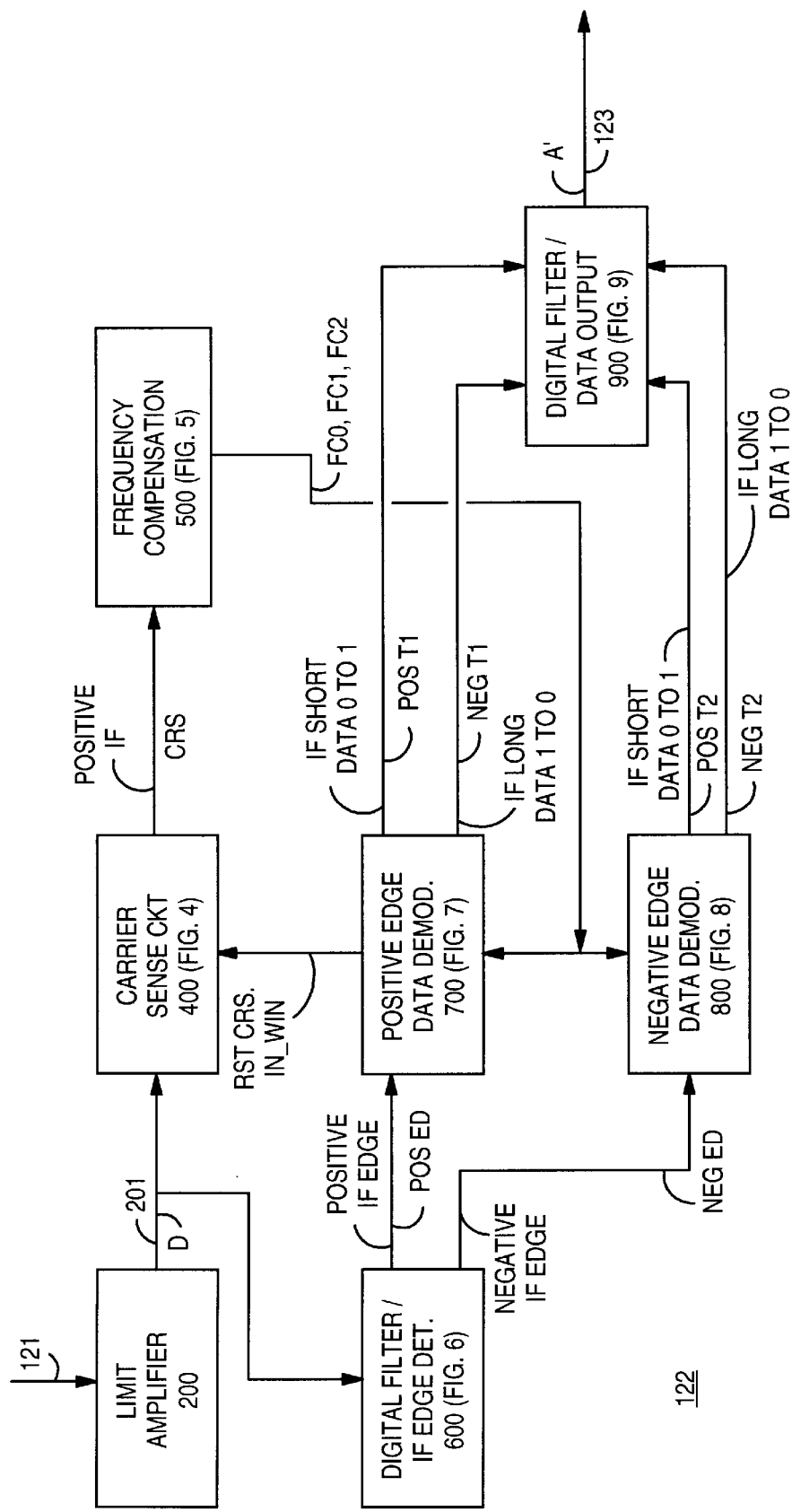
FIG. 3 is a functional block diagram of the demodulator 122 in the receiver, in accordance with the invention.

In FIG. 3, the demodulator 122 has its input 121 connected to the limit amplifier 200, for amplifying the filtered intermediate frequency signal C' to form the square wave, limit-amplified signal D shown in FIG. 1A. The square wave signal D will have its zero crossings at the same instant as the zero crossings of the sinewave signal C'. It can be seen by inspection of FIG. 1A, that the duration of each period for the waveform D remains approximately 500 nanoseconds long for normal intervals when there is no phase change applied to the carrier signal B at the transmitter. However, at time T1, when there is a 1-to-0 transition in the data waveform A, there is a corresponding lengthening of the duration of the intermediate frequency signal D to approximately 625 nanoseconds. Further, by inspection it can be seen that at the instant T2 when the data waveform A transitions from a binary 0 to a binary 1, the intermediate frequency waveform D has the duration of its period reduced to approximately 375 nanoseconds. In accordance with the invention, the demodulator circuit 122 of FIG. 3 will detect the occurrence of changes in the duration of the intermediate frequency signal D and will correctly reconstruct the data waveform as the output signal A'. The modulation could be done in the opposite manner, for example, by applying a phase shift delay when the binary input waveform A rises from a 0 value to a 1 and removing the phase shift delay when the binary value transitions from a 1 to a 0, for example.

It is seen that the circuit of FIG. 3 monitors the time intervals between consecutive positive going edges of the D waveform and, in addition, it also monitors the time intervals between consecutive falling edges of the D waveform. In accordance with the invention, this dual monitoring of both the positive going edges of the D waveform and the negative going edges of the D waveform accommodates the asynchronous character between the data waveform A and the intermediate frequency waveform D. For example, if a binary 1-to-0 transition occurred in the data waveform A at an instant close to the transition of the intermediate frequency waveform D, then the modulated character of the waveform might be missed for the PSK measurement of the occurrence of that data transition; however, it would be correctly reflected in the corresponding negative edges of the intermediate frequency waveform. Thus, by monitoring both positive edges and negative edges, it is certain that the asynchronous transitions of the binary waveform A will have their modulated manifestation detectable in the intermediate frequency waveform D.

Figure 4:
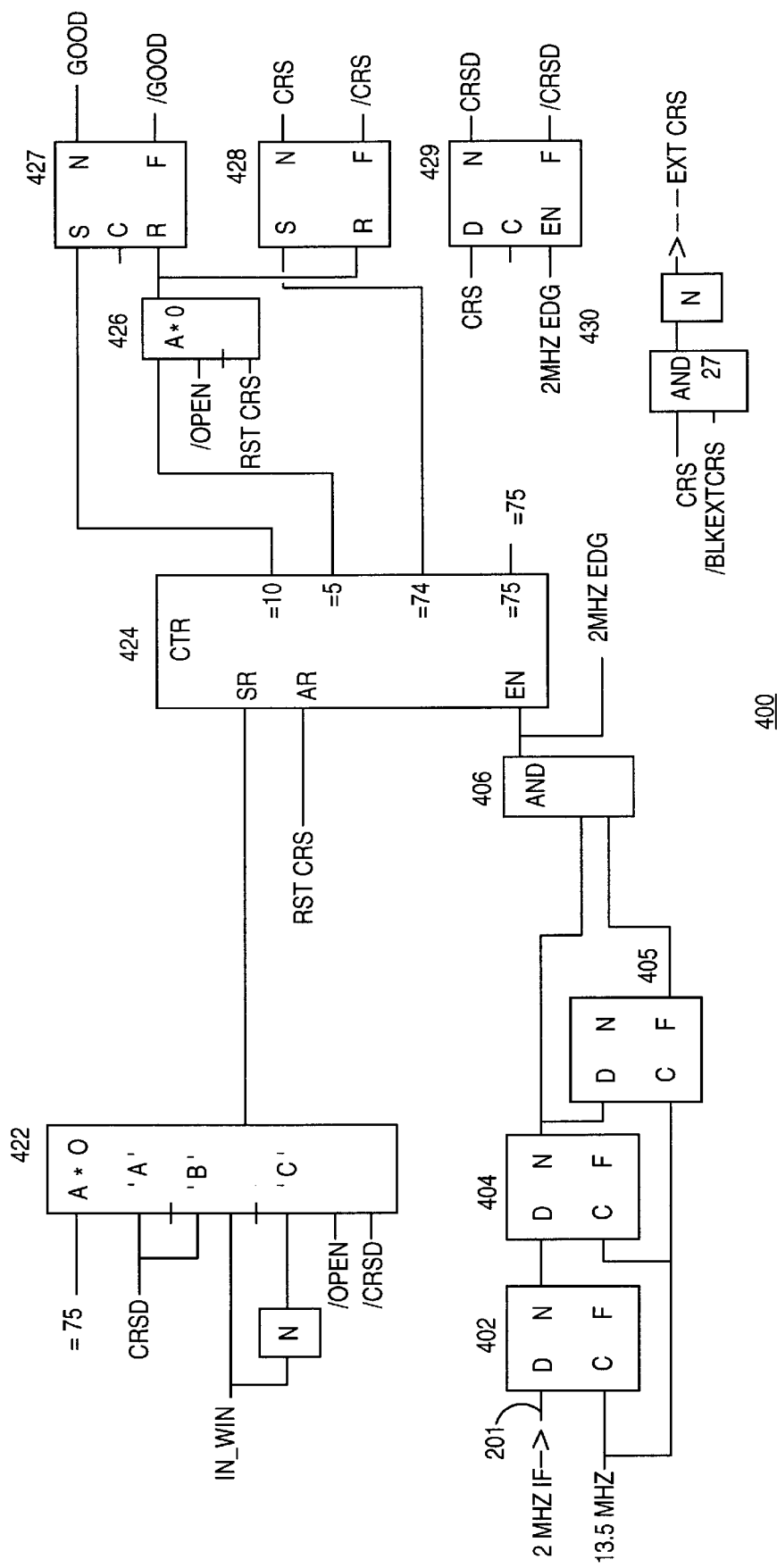
FIG. 4 is a logic block diagram of the carrier sense circuit, in accordance with the invention.

The demodulator circuit 122 of FIG. 3 takes the output D from limit amplifier 200 and applies it to the carrier sense circuit 400, which is shown in greater detail in FIG. 4. The carrier sense circuit 400 correctly detects the presence of the carrier signal bearing a 2 MHz modulated intermediate frequency signal, and outputs a signal CRS representing a successful detection of the carrier signal. This is output to the frequency compensation circuit 500, shown in FIG. 5.

Figure 6:
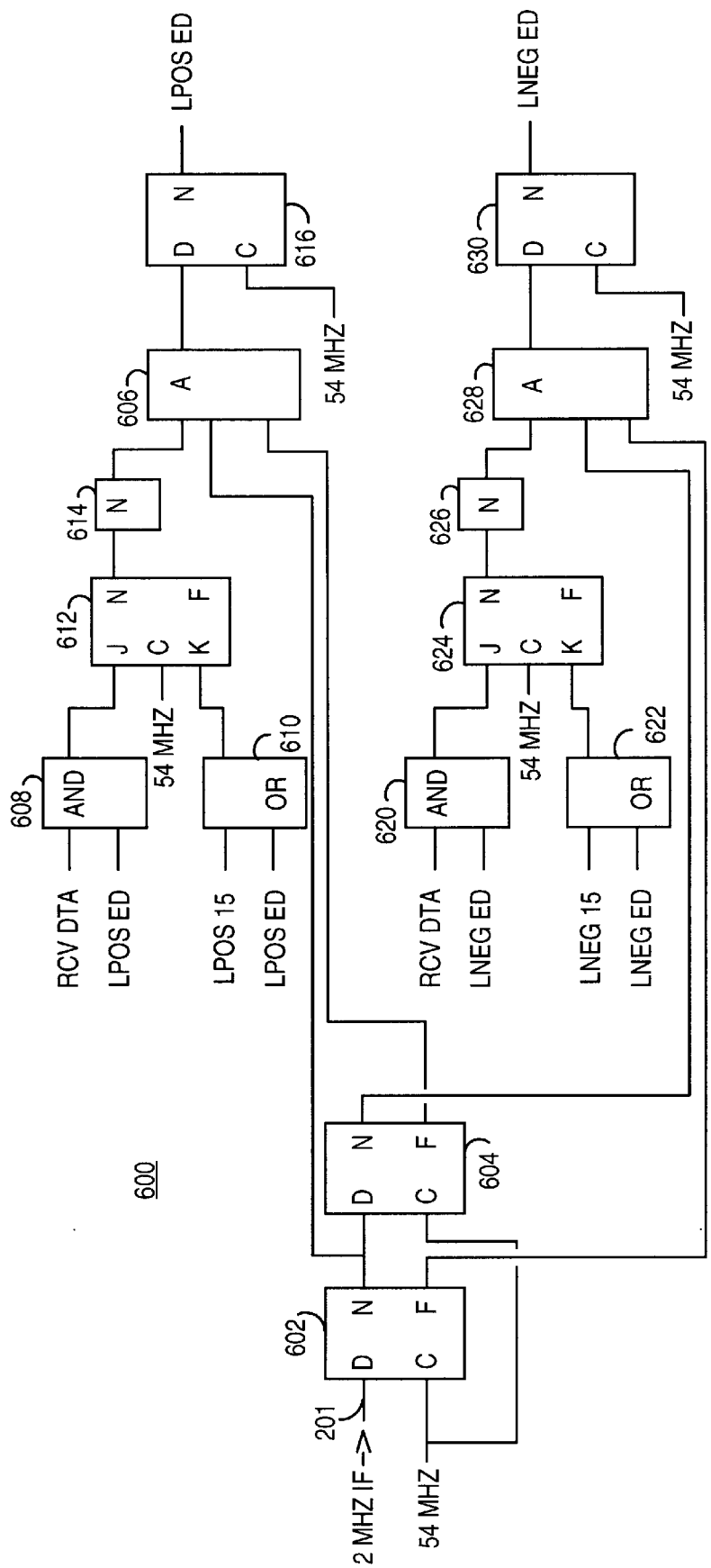
FIG. 6 is a logic block diagram of the digital filter and intermediate frequency edge detector, in accordance with the invention.

The output D from the limit amplifier 200 in FIG. 3 is also applied to the digital filter and intermediate frequency edge detector 600, shown in FIG. 6. The circuit of FIG. 6 correctly detects a positive going edge of the intermediate frequency waveform. This signal is applied as POS ED as the positive edge detection signal to the positive edge data demodulator 700, shown in FIG. 7. The digital filter and intermediate frequency edge detector circuit 600 of FIG. 6 also correctly detects a negative going edge of the intermediate frequency waveform. This recognition is output as the signal NEG ED to the negative edge data demodulator circuit 800 of FIG. 8.

Figure 7:
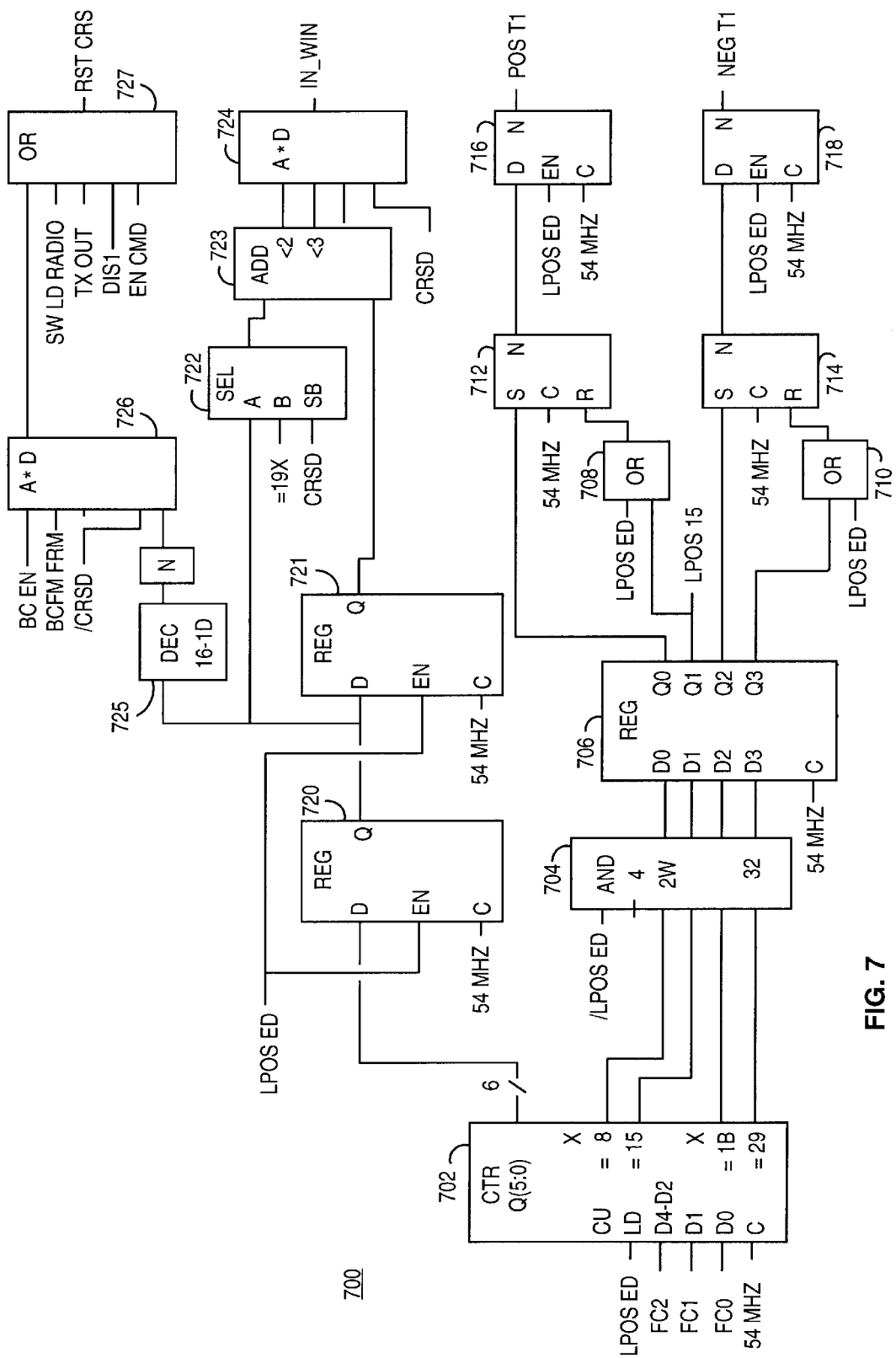
FIG. 7 is a logic block diagram of the positive edge data demodulator circuit, in accordance with the invention.

The positive edge data demodulator circuit 700 of FIG. 7 correctly identifies a short duration interval between consecutive positive edges of the intermediate frequency waveform D, which represents a transition from a binary 0 to a binary 1 for the data waveform A. This information is output as the signal POS T1 to the digital filter and data output circuit 900 of FIG. 9. The positive edge data demodulator circuit 700 of FIG. 7 also correctly detects a long duration interval between consecutive positive intermediate frequency edges for the waveform D, and outputs this recognition as the signal NEG T1 to the digital filter and data output circuit 900 of FIG. 9. The frequency compensation circuit of FIG. 5 outputs signals FC0, FC1, and FC2 to the positive edge data demodulator circuit 700 of FIG. 7, for the purpose of applying a digital offset to the circuit 700 to compensate for changes in the frequency of the nominally 2 MHz frequency for the intermediate frequency signal D. When the system is in a carrier sense measurement mode, if the duration interval between positive edges of the intermediate frequency waveform D is not within a specified range, positive edge data demodulator circuit 700 generates a signal (RST CRS) that resets the carrier sense circuit 400 and restarts a carrier sense measurement. If the duration of a cycle while in this mode varies more than a predetermined amour from cycle to cycle of the intermediate frequency signal, then the positive edge data demodulator circuit 700 generates another signal that resets the carrier sense circuit 400 and restarts a carrier sense measurement.

Figure 8:
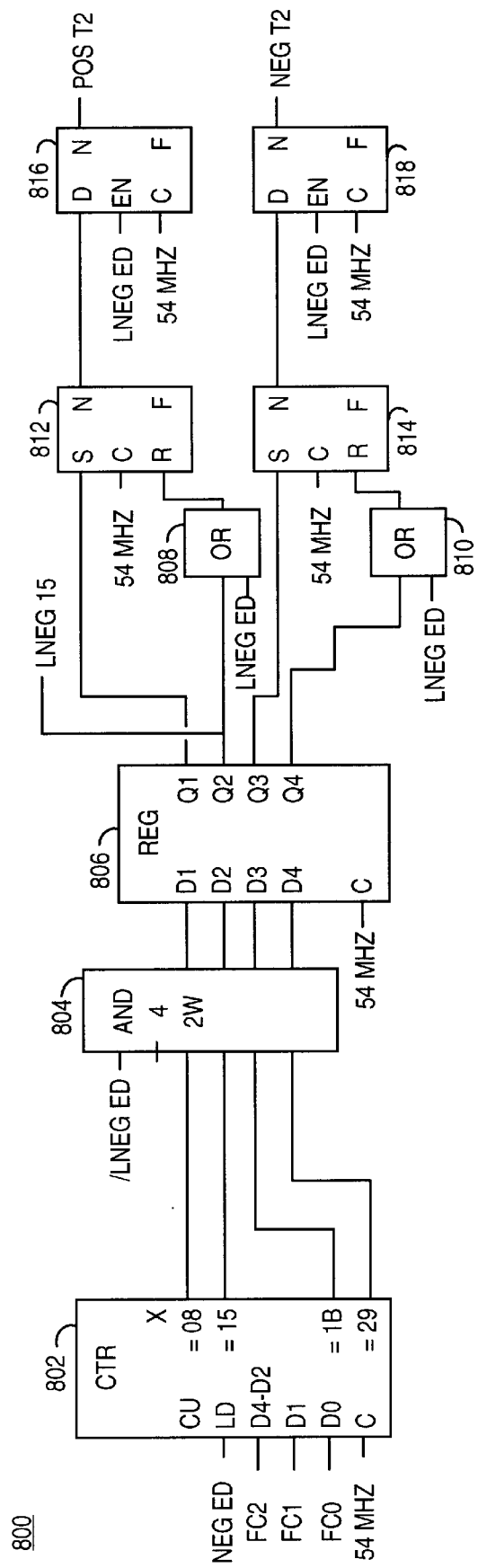
FIG. 8 is a logic block diagram of the negative edge data demodulator circuit, in accordance with the invention.
Figure 9:
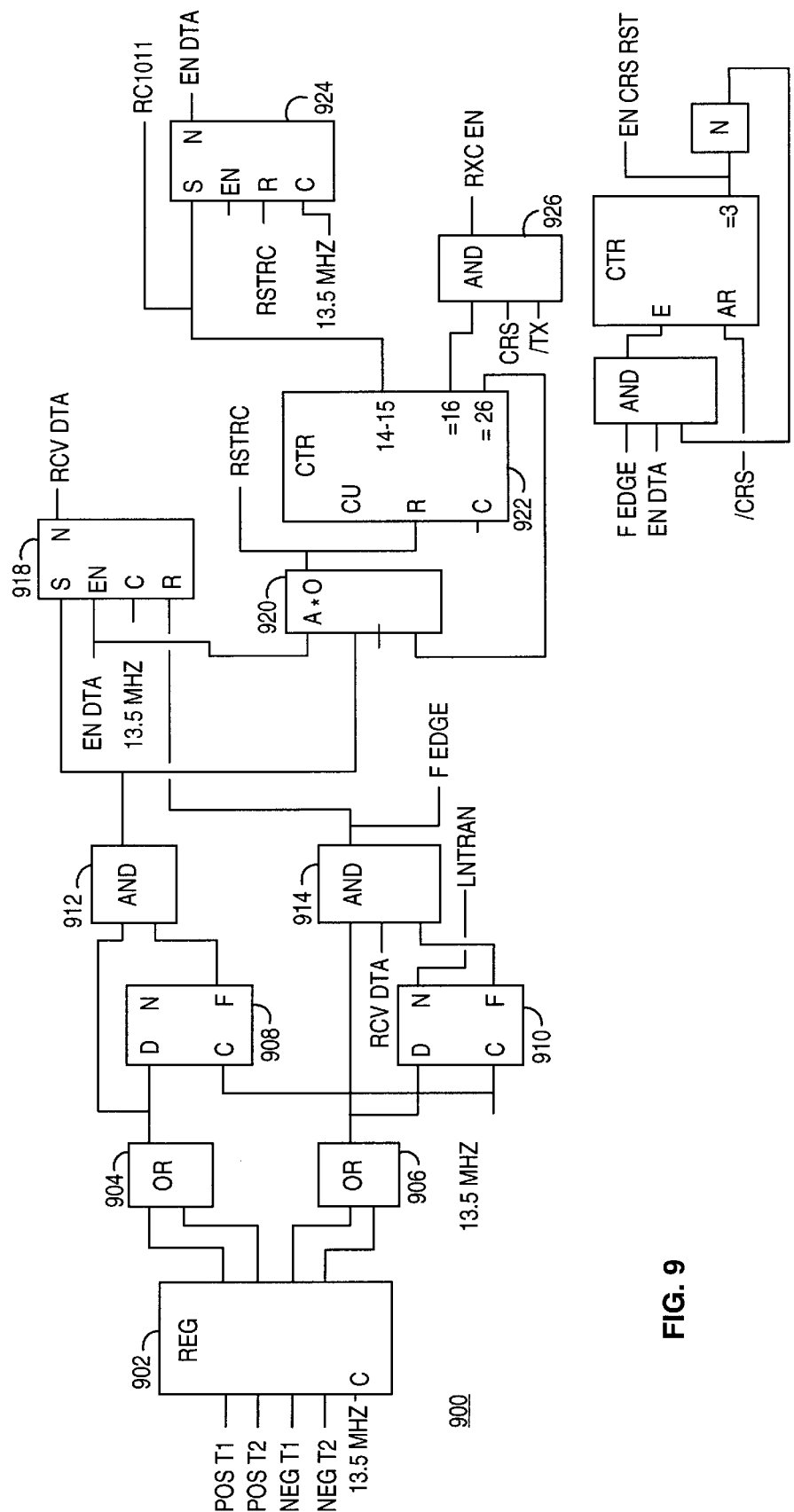
FIG. 9 is a logic block diagram of the digital filter and data output circuit, in accordance with the invention.

The negative edge data demodulator circuit 800 correctly detects the short duration between consecutive negative edges of the intermediate frequency signal D and outputs a recognition signal POS T2 to the digital filter and data output circuit 900 of FIG. 9. The negative edge data demodulator circuit 800 of FIG. 8 also correctly detects the occurrence of long duration intervals between consecutive negative edges of the intermediate frequency signal D, outputting the recognition signal NEG T2 to the digital filter and data output circuit 900 of FIG. 9. The frequency compensation circuit of FIG. 5 outputs the signals FC0, FC1, and FC2 to the negative edge data demodulator circuit 800 of FIG. 8 to apply a digital offset to the circuit 800 to compensate for variations in the nominal 2 MHz frequency of the intermediate frequency signal D.

The digital filter and data output circuit 900 of FIG. 9 correctly outputs the reconstructed binary value A' of the digital data waveform A. The circuit 900 of FIG. 9 applies a digital filter to prevent ringing of the input signal from being misinterpreted as date for the output signal. The reconstructed signal A' is output on line 123 from the demodulator 122 to the local area network interface adapter 124. The digital filtering function performed by the circuit of FIG. 9 monitors binary 0 to binary 1 transitions, and binary 1 to binary 0 transitions of the data waveform A, and blocks the recognition of any further binary data transitions in waveform A for a subsequent 800-nanosecond interval. This is done to prevent spurious ringing signals from confusing the circuitry during the 800-nanosecond interval following a valid data transition in waveform A.

In this manner, the invention successfully accomplishes the detection of the intermediate frequency signal on the 2.4 GHz carrier, it successfully applies frequency compensation to overcome a carrier frequency drift, and it successfully demodulates the intermediate frequency signal to reconstruct the binary digital waveform.

Reference to FIG. 1A will show the intervals between consecutive rising edges of the waveform D, represented as R, and the intervals between consecutive falling edges of the waveform D, represented as F. It can be seen that the intervals between rising edges R are four consecutive periods of 500 nanoseconds for normal intervals, followed by a long interval of 625 nanoseconds at the time T1 when the transition from a binary 1 to a binary 0 occurs for the data waveform A. This is followed by two 500 nanosecond periods which are normal, followed by a short period of 375 nanoseconds, the duration of which is cut short by the occurrence at time T2 of the transition from a binary 0 to a binary 1 for the data waveform A. T2 is then followed by two more normal intervals R of 500 nanoseconds between the rising edges of D. Correspondingly, the falling edge of the waveform D represented by the intervals F in FIG. 1A, shows three consecutive intervals of 500 nanoseconds for the normal intervals, followed by a long interval of 625 nanoseconds which spans the instant of time T1. This is followed by three consecutive normal intervals of 500 nanoseconds and then a short interval of 375 nanoseconds which spans the instant of T2. This is then followed by a normal interval of 500 nanoseconds. The invention is able to identify these normal, long and short intervals for both the rising edge and falling edge of the waveform D, and to correctly infer and reconstruct the data waveform A, as the reconstructed waveform A'.

Figure 10:
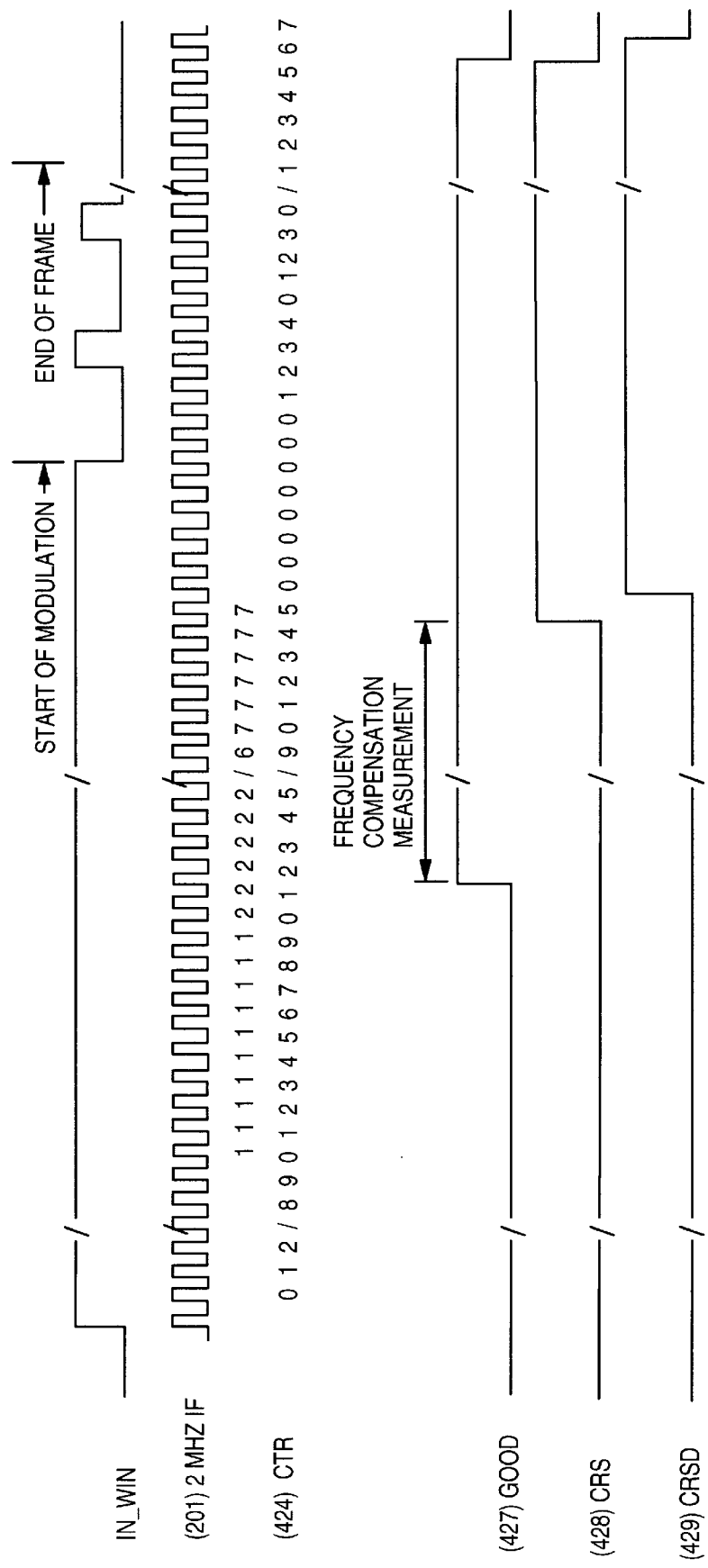
FIG. 10 is a timing diagram of the carrier sense operation.

FIG. 4 is a more detailed illustration of the logic for the carrier sense circuit 400. FIG. 10 shows a diagram for the carrier sense timing. The 2 MHz intermediate frequency signal D is input on line 201 to latch 402. Latch 402 is connected to latch 404 and to latch 405. The output of latch 404 and the inverted output of latch 405 are applied to AND gate 406. Gate 406 outputs a signal for every positive edge detected for the input waveform D. The output of AND gate 406 is 2 MHZ EDG and is applied to counter 424 which counts the 2 MHZ EDG signal. Counter 424 has four output decodes set to go high after the respective durations shown in the figure. The output CS=5 of counter 424 is applied to an input of AND-OR gate 426. The output of AND-OR gate 426 is applied to the R input of latch 427 and to the R input of latch 428. The output CS=10 is applied to the S input of latch 427. Output CS=74 is applied to the S input of latch 428. Output CS=75 is applied to an input of AND-OR gate 422. The signal IN_WIN, generated by the positive edge data demodulator circuit 700 is applied to another input of AND-OR gate 422. The output of AND-OR gate 422 is applied to the synchronous reset input SR of counter 424. The signal RST CRS, output from OR gate 727 in positive edge data demodulator circuit 700, resets the count of counter 424 during a carrier sense measurement when the measured duration of a cycle of the intermediate frequency waveform D exceeds a predetermined tolerance for the duration of one cycle of the intermediate frequency at the nominal center frequency. When enabled, counter 424 counts consecutive occurrences of intermediate frequency waveform, and if it successfully counts to 10, frequency compensation circuit 500 is enabled via the GOOD and /GOOD outputs of latch 427. If counter 424 successfully counts to 74, the carrier sense signal CRS indicating that the carrier has been detected is output via latch 428. The signal CRS is then applied to the LAN interface adapter 124 of FIG. 2 to signal the receiving node to begin looking at the data content of the demodulated output waveform A'. At count 75, the =75 output signal is applied to AND gate 422. Counter 424 is reset and made ready for detecting a loss of the carrier.

Figure 5:
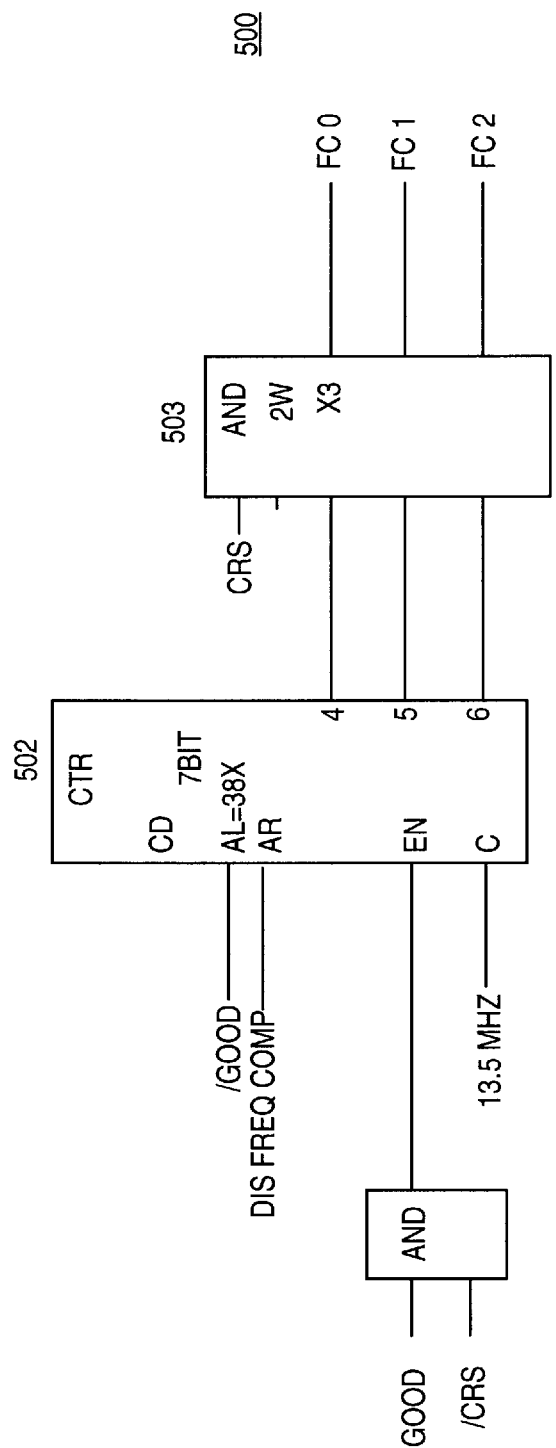
FIG. 5 is a logic block diagram of the frequency compensation circuit, in accordance with the invention.

The frequency compensation circuit 500 of FIG. 5 includes the counter 502, which is a 7-bit counter that counts down. The counter counts the 13.5 MHz clock pulse and is enabled by the ANDing of signals GOOD and /CRS. The counter 502 counts how long it takes to successfully detect 64 consecutive intermediate frequency cycles of the D waveform. If the intermediate frequency D waveform is exactly 2 MHz in frequency, then the outputs from the counter 502 will be FC0=0, FC1=0, and FC2=0. If it takes a longer time than nominal to count 64 consecutive IF cycles, then the actual frequency of the intermediate frequency waveform D is less than 2 MHz and the values of FC0, FC1 and FC2 will apply a negative offset to the counters 702 and 802 in FIGS. 7 and 8. Conversely, if it takes less than the nominal duration of time to count 64 consecutive IF signals in the counter 502 of FIG. 5, then the values of FC0, FC1 and FC2 will provide a positive offset, reflecting that the actual frequency of the intermediate frequency waveform D is higher than the nominal 2 MHz. This positive offset is then applied to the counter 702 in FIG. 7 and counter 802 in FIG. 8. The counter 502 in FIG. 5 has as one input the /GOOD input and that is the output F from the good latch 427 in FIG. 4. When the /GOOD input is active at the counter 502, the counter has pre-loaded a hex value of 38 hex or a decimal value of 56 into the counter. If the nominal 2 MHz frequency currently exists for the IF waveform D, then the counter 502 will count down for 64 cycles of the IF waveform, and this will take 32 microseconds. This would correspond to 432 counts of the 13.5 MHz clock applied to the counter 502. Since the counter 502 is a 7-bit counter, it will wrap three times in counting down from the preloaded value of 56, and the resulting value in the 7-bit counter will be a value of 8. Since FC0, FC1 and FC2 are the high order bits of the 7-bit counter, their values will be 0, 0, and 0, respectively, for this condition. Alternately, if the IF frequency is low, then the counter 502 will count more than the nominal 432 counts and as the counter counts down, the next 8 counts of the 13.5 MHz clock it will wrap. As this occurs, all binary 1's will exist in the 7 bits of the counter. This corresponds to a signed binary value of −1. Thus, the values of FC0, FC1 and FC2, when they are all 1's, corresponds to a value of −1. This negative value is then applied as a negative offset to the counters 702 in FIG. 7 and 802 in FIG. 8. Alternately, if the IF frequency is higher than the nominal 2 MHz, then the counter 502 will not completely count the 432 counts corresponding to a nominal frequency. There will thus be a corresponding positive binary value for FC0, FC1 and FC2, and this will be applied as a positive offset to the counter 702 in FIG. 7 and the counter 802 in FIG. 8.

FIG. 6 is a detailed logic block diagram of the digital filter and intermediate frequency edge detector circuit 600. The waveform D is input on line 201 to the D input of the latch 602, and the 54 MHz clock pulse is applied to the C input. The N output is connected to the D input of the latch 604, and the 54 MHz clock signal is applied to the C input of the latch 604. The N output of the first latch 602 is applied to one input of the AND gate 606, and the F output of the second latch 604 is applied to the second input of the AND gate 606. When both inputs to the AND gate 606 are high, that indicates that a positive going edge has been detected. The third input to the AND gave 606 is part of the digital filter which avoids the detection of false positive data transitions. If the actual data waveform A is a binary 1, and if another positive edge is detected before 422 nanoseconds, then the circuit ignores a rising edge detection. The AND gate 608 has as one input the signal RCV DTA which is output from the latch 918 in FIG. 9. This signal is the main output of the demodulator 122 and is high when the data waveform A' is high and is 0 when the data output for A' is 0. The other input to the AND gate 608 is LPOS ED which is the output of the latch 616 in FIG. 6. If both of these signals are high, the AND gate 608 sets the latch 612 and the corresponding output from the N terminal of latch 612 is applied through the inverter 614 to a third input of the AND gate 606. This disables the AND gate 606 and prevents a signal being applied to the D input of the output latch 616. This digital filtering operation avoids the recognition of false positive data. Correspondingly, the OR gate 610 has the signal LPOS 15 applied to one input, which comes from the register 706 of FIG. 7. The other input to the OR gate 610 is LPOS ED which is the output of the latch 616 of FIG. 6. The output of the OR gate 610 is applied to the reset of the latch 612.

One aspect of the digital filter and IF edge detector 600 of FIG. 6 is the digital filtering feature which prevents a false detection of a data signal for waveform A. In FIG. 6, the AND gate 608 has as one of its inputs the RCV DTA input, which is the reconstructed waveform A' output from the circuit of FIG. 9. When the reconstructed waveform A' has a binary 1 value, the digital filter in FIG. 6 blocks any indication that a transition from a binary 0 to a binary 1 is taking place with the waveform A. This transition would not take place if there is a valid current binary 1 state for the waveform A and its corresponding reconstructed waveform A'. Thus, once a latched positive signal is output from the latch 616 in FIG. 6, it is applied as one input to the AND gate 608 and the received data signal RCV DTA, which is high, is applied to the other input of the AND gate 608. This sets the S input for the latch 612. The latch 612 is thus set on every positive edge of the IF signal for as long as there is a binary 1 state for the value A' waveform. The output of the latch 612 is inverted through the inverter 614 and applied to one of the three inputs of the AND gate 606. Thus, if the latches 602 and 604 apply positive inputs to the AND gate 606 indicating that a positive edge has been detected for the IF waveform D, the AND gate 606 will only be enabled if the received data value is low. If the received data value is high, then the input to the AND gate 606 is not enabled until the latch 612 is reset. The latch 612 is not reset until the latched positive 15 signal from counter 702 is applied through the OR gate 610 to the reset input of the latch 612. The LPOS 15 signal from the counter 702 does not go high until 422 nanoseconds after the occurrence of the positive edge LPOS ED output from the latch 616. Thus, it is seen that for an interval of 422 nanoseconds following the occurrence of LPOS ED that the LPOS ED output will be disabled. This in effect blocks the recognition of any short interval between consecutive rising edges of the IF waveform D, which would erroneously correspond to an erroneous indication of a rising data waveform signal from A=0 to A=1. A similar operation takes place for the circuit driving the AND gate 628 into the latch 630 for the negative edge detection circuitry of FIG. 6. Turning to FIG. 1A, the diagram of the IF signal waveform D shows at the beginning of time T1 that the IF waveform is phase delayed by 90°. The design of the receiver 116 includes a low pass filter to minimize overlapping cross-talk from nearby channels. A low pass filter 150 filters the IF output from the mixer 120 before it is applied to the demodulator 122 in FIG. 2. The purpose of the low pass filter is to block out nearby IF channels in a frequency multiplexed application. In particular, where frequency hopping is performed between nearby IF bands, each of which is 1 MHz wide, it is important to eliminate cross-talk from such nearby channels. As a consequence of such low pass filtering when a 90° phase delay is applied, such as at time T1, if there were no low pass filter the waveform immediately following T1 for waveform C would be relatively flat. However, because of the low pass filter and the elimination of high frequency components in the waveform C, the waveform appears to have a small peak above 0 and a small valley below 0 immediately following the time T1. When the limit amplifier in FIG. 3 is applied to the waveform C', it amplifies the small peak and the small valley in the waveform C' to get a distinct spurious square wave following the time T1. This square wave must be blocked from being interpreted as an indication of a valid transition of either a rising edge or a falling edge for the IF waveform. This is done by the digital filtering circuitry of FIG. 6. Attention is directed to the latch 612 waveform shown in FIG. 1A, which indicates the binary state of the latch 612 in the digital filter of FIG. 6. The latch 612 is seen to stay in an on state for a period of 422 nanoseconds. The 422 nanosecond duration of the on state for the latch 612 prevents the circuit of FIG. 6 from recognizing the negative edge and following positive edge immediately after T1 as being valid edges for the IF waveform. In this manner, the digital filter compensates for the necessity of applying low pass filtering to the IF waveform to avoid overlapping adjacent channels in a frequency hopping application. Note that after latch 918 falls, as is shown in the waveform of FIG. 1A, latch 612 no longer is set and this is reflected in the waveform for latch 612 also shown in FIG. 1A. Not until the waveform A rises again at time T2 will latch 918 become set and correspondingly latch 612 periodically set to once again apply the digital filtering to the IF waveform to ignore the spurious pulses due to the low pass filtering of the IF waveform.

A similar operation occurs for the negative edge detection portion of the circuit 600 of FIG. 6 AND gate 620 has the input signals RCV DTA and LNEG ED. The output of the AND gate 620 is applied to the set input of the latch 624. The latch 624 is clocked with a 54 MHz clock. The other input to the latch at the reset input is from the OR gate 622 which has the input LNEG 15 which comes from the counter 806 in FIG. 8. The other input to the OR gate 622 is LNEG ED. The output of the latch 624 is applied through an inverter 626 to one input of the AND gate 628. The F output of latch 602 is applied to a second input of the AND gate 628 and the N output of the latch 604 is applied to the third input of the AND gate 628. The AND gate 628 is enabled whenever a falling edge is detected for the intermediate frequency waveform D. This is output to the D input of the latch 630 which is clocked at 54 MHz and provides the output signal LNEG ED representing the falling edge having been detected. The signal LPOS ED is applied the counter 702 of FIG. 7 for positive edge data demodulation and the signal LNEG ED is applied to the counter 802 of FIG. 8 for negative edge data demodulation.

FIG. 7 shows a logic block diagram for the positive edge detection data demodulation circuit 700. The counter 702 counts up the 54 MHz clock pulses applied at input C. The LPOS ED signal, representing a positive edge detection for the IF waveform D, is applied to the counter and digital offset values FC0, FC1 and FC2 are applied from the frequency compensation circuit of FIG. 5. Counter 702 has 6 Q outputs that are applied to the D inputs of register 720. The Q outputs of latch 720 are applied to the D inputs of latch 721. Both latch 720 and 721 are clocked by the 54 MHZ clock signal and both are enabled by the LPOS ED signal output by latch 616 of circuit 600 of FIG. 6. The Q outputs of latch 720 are applied to the input of decoder 725 and to the A inputs of data selector 722. The output of decoder 725 is inverted and applied to an input of AND-OR gate 726. The Q outputs of latch 721 are applied to one input of adder 723. The outputs of adder 723 are applied to the inputs of AND-OR gate 724.

When looking for a carrier sense condition, latch 616 of circuit 600 in FIG. 6 develops a gating pulse LPQS ED of 18.5 ns duration used to gate the measurement of the IF period. Counter 702 is initially loaded with zeros at the occurrence of LPOS ED. Counter 702 then counts up with the 54 MHZ clock until the next LPOS ED pulse is generated. The occurrence of the second LPOS ED pulse loads registers 720 and 721 and initializes counter 702 with zeros. Register 720 contains a measured value for the time period of one cycle of the IF signal. If the value in register 720 is not within the range hex 16 to hex 1D, that is, within the range of 407 ns to 556 ns (500 ns nominal) decoder 725 causes the signal RST CRS to be generated via AND-OR gale 726 and OR gate 727. When RST CRS is generated, the measurement of the IF period is restarted by resetting counter 424, which in turn clears latches 427, 428 and, 429. If the value in register 720 is within about 50 ns of the nominal time period for 1 cycle of a nominal 2 MHz IF signal, that is, within hex 16 to hex 1D, the signal RST CRS is not generated and counter 424 is not reset.

On subsequent successive cycles of the intermediate frequency signal, adder 723 makes a comparison of the values stored in registers 720 and 721 since the signal CRS is not active and the B inputs to data selector 722 are not selected. As long as the values stored in registers 720 and 721 are within less than 2 counts of each other, that is, less than about 36 ns different, then the signal IN_WIN is generated via AND-OR gate 724. Counter 424 continues to count cycles of the IF signal until it counts 10 cycles that are within the range of decoder 725 and are simultaneously less than two counts for consecutive cycles, that is, having a delta of less than 2. At a count of 10 cycles, frequency compensation circuit 500 of FIG. 5 is enabled via the GOOD and /GOOD outputs of latch 427. If the IN_WIN output goes inactive, meaning that the difference between the values stored in registers 720 and 721 was two or greater, counter 424 resets via the sub-portion C of AND-OR 422. If the delta between the values stored in registers 720 and 721 remains less than two for 74 consecutive IF pulses, latch 428 is set, indicating that a valid carrier sense indication, or condition, has been detected. On the next IF cycle, that is, cycle 75, counter 424 is reset to zero via AND-OR gate 422 subportion A and latch 429 is set, indicating that the carrier sense measurement is complete. The CRS signal is output to the media access logic of the system by latch 428 for execution of a collision avoidance algorithm.

The carrier sense circuitry of circuits 700 and 400 are now in a mode of looking for a valid end in the carrier sense indication. This is accomplished by looking for a nominal IF cycle to occur at least once for every five cycles of the waveform D in FIG. 1. The circuitry that accomplishes this measurement is via data selector 722. When the signal CRS is generated, the B inputs to selector 722 having a value corresponding to the time period for one nominal cycle of the IF signal, for example, hex 19, are selected. The value in register 721 is then compared by adder 723 to the value applied to the B inputs of selector 722. The output IN_WIN becomes active anytime that the value in register 721 is within 3 counts of the value applied to the B inputs of selector 722.

Since counter 424 was reset at the count 75 and is now able to count up again, the IN_WIN output must reset counter 424 via AND-OR gate 422 sub-portion B at least once every 5 IF cycles. If this happens, the carrier sense indication will be maintained. Otherwise, if counter 424 is not reset, the =5 output of counter 424 will reset latches 427 and 428 via AND-OR gate 426. This causes the CRS signal to become inactive, indicating loss of the carrier sense condition. The inactive CRS signal is used by the medium access control logic in the collision avoidance algorithm, enabling the node to now transmit data to another node. The carrier sense circuitry is ready to detect another valid carrier sense condition.

The counter 702 also has four decoded outputs, the first output 8 represents a 200 nanosecond duration, the output 15 represents a 426 nanosecond duration, the output 1B represents a 574 nanosecond duration, and the output 29 represents a 796 nanosecond duration. These decoded signals from the counter 702 are applied through the staging logic 704. The AND gate 704 is four two input AND gates, with one of the inputs being the not positive edge signal and the other input of the AND gate being from each of the respective decoded outputs shown for the counter 702. The output of the AND gate 704 is applied to the input of the staging register 706. The net effect of the AND gate 704 and the staging register 706 is to properly stage the outputs of the counter 702 so that they can be appropriately applied to the following logic circuitry in FIG. 7. Similar comments can be made for the AND gate 804 and staging register 806 of FIG. 8.

The output of the gate 704 is then applied to the register 706 which is clocked at 54 MHz and provides a staging operation for the decoded signal lines output from the counter 702. The decoded signal lines are then output from the register 706 and applied as follows. The 204 nanosecond output decode 8 is applied to the set input of the latch 712. The 426 nanosecond output 15 from counter 702 is applied through the OR gate 708 to the reset input of the latch 712. The other input to the OR gate 708 is the LPOS ED signal. The output of the latch 712 is the window latch and it is applied to the D input of latch 716. The output of latch 716 is POS T1 and represents the detection of a short interval between consecutive positive edges of the waveform D, corresponding to a 0-to-1 transition of the data waveform A. The 1B output which is the 574 nanosecond decode output from counter 702 is applied through register 706 to the set input of the latch 714 and the 796 nanosecond decoded output 29 from the counter 702 is applied through the register 706 and the OR gate 710 to the reset input of the latch 714. The other input to the OR gate is LPOS ED. The output of the latch 714 is applied to the D input of the latch 718 whose output is NEG T1. This signal represents the detection of a long duration between consecutive positive edges of the input waveform D, which corresponds to a 1-to-0 transition for the binary data waveform A. The POS T1 output from latch 716 represents a short duration of between 200–422 nanoseconds. The output NEG T1 from latch 718 represents a long duration of from 568 to 800 nanoseconds. These signals are applied to the digital filter and data output circuit of FIG. 9.

FIG. 8 is organized in a manner similar to that shown for FIG. 7. Counter 802 receives NEG ED signal, the FC0, FC1 and FC2 signals, and counts a 54 MHz clock. It outputs 200, 422, 568 and 800 nanosecond decoded signals which are applied through the logic 804 and the register 806 to the latch 812, the OR gate 808, the latch 814 and the OR gate 810. The output of the latch 812 is applied to the D input of the latch 816, whose output is POS T2 which represents the detection of a short duration between consecutive negative edges of the input waveform D. The output of latch 814 is applied to the D input of the latch 818 which outputs the signal NEG T2. This signal represents detection of a long duration between consecutive negative edges of the input waveform D. A short duration for POS T2 indicates a transition of the data waveform A from binary 0 to binary 1. A long duration represented by NEG T2 represents a binary transition from a binary 1 to a binary 0 for the data A. These signals are applied to the digital filter and data output circuit 900 of FIG. 9.

FIG. 9 shows the register 902 which receives these signals and outputs them through the OR circuits 904 and 906. The latch 908 is connected to the AND gate 912 which is satisfied when a short transition signal is received, of the waveform D. The output of the AND gate 912 sets the output latch 918 for RCV DTA, indicating that a transition from binary 0 to binary 1 has been detected. OR 906 is output to latch 910 and AND gate 914. AND gate 914 is satisfied when a long duration signal is received. The output of the AND gate 914 is to the reset input of the latch 918.

The register 902 in FIG. 9 has the long duration signals NEG T1 and NEG T2 applied through the register 902 and OR gate 906 to the AND gate 914 and the latch 910. When a negative edge is detected, either for the negative edge detector or for the positive edge detector, then the AND gate 914 is satisfied and resets the latch 918. The output RCV DTA then goes from 1 to 0, which reconstructs the binary 1 to binary 0 transition of the data waveform A. The latch 910 has an output from its N terminal labelled LNTRAN. The AND gate 912 in FIG. 9 has an output applied to the AND-OR gate 920, which has another output to its AND gate applied from the enable data signal EN DTA. This signal comes from the output latch 924 in FIG. 9, and is used in the digital filter feature of this circuit which prevents ringing signals from being detected. The other input to the OR gate of the gate 920 is a signal 26 output from the counter 922.

The output of the gate 920 is applied to the reset terminal of the counter 922. The counter 922 counts up and counts 13.5 MHz clock pulses. It has a 14–15 output which is applied to the set input of the latch 924. The latch 924 has a clock input from the 13.5 MHz clock. It has a reset input RSTRC from AND gate 920. The output of the latch 924 is EN DTA which represents the period following a 1.11 millisecond interval, after which valid signals may be detected.

Figure 11:
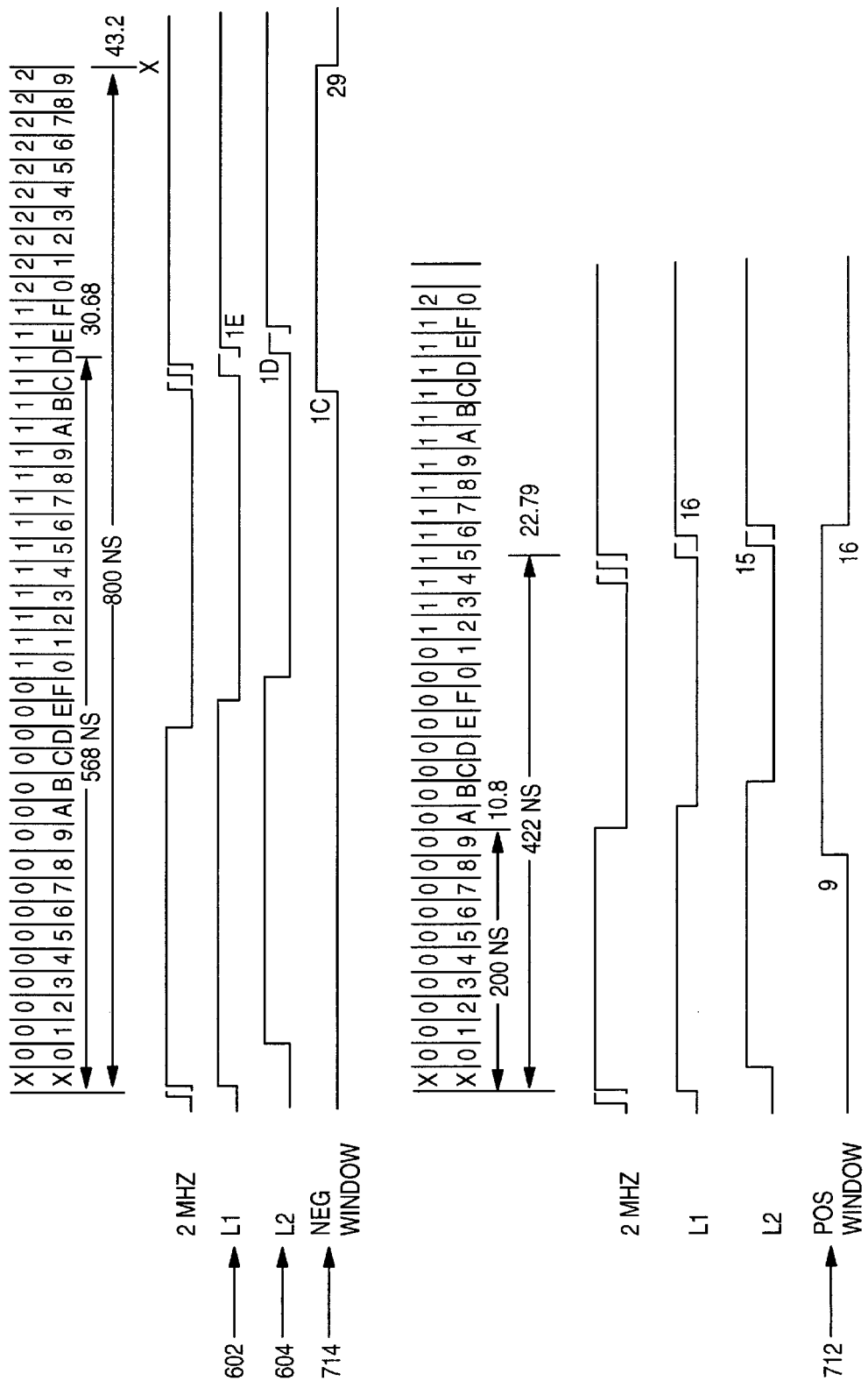
FIG. 11 is a timing diagram of the data demodulation operation of the invention.

FIG. 11 is a timing diagram of the data demodulation. The NEG window waveform pertains to the latch 714. The POS window waveform pertains to the latch 712. In FIG. 11, the L waveform corresponds to the latch 602 and the L2 waveform corresponds to the latch 604 in FIG. 6. The NEG window waveform corresponds to the latch 714 in FIG. 7 and the POS window waveform corresponds to the latch 712 in FIG. 7.

Figure 12:
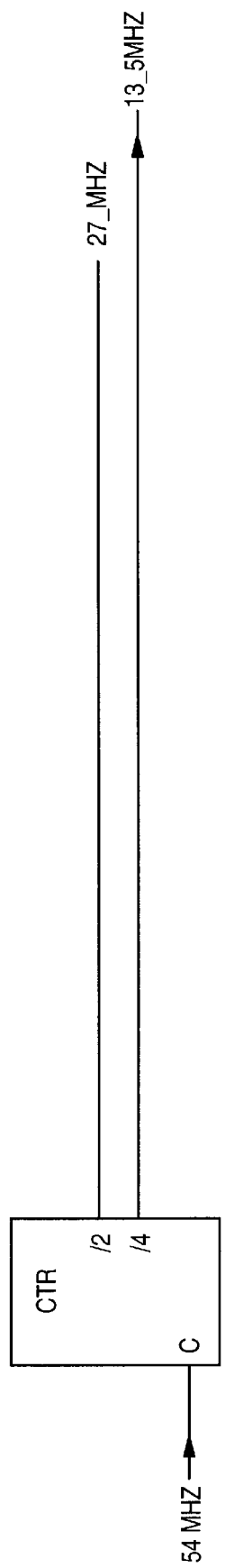
FIG. 12 is a logic block diagram of the clock pulse generation circuit.

FIG. 12 is a logic diagram illustrating how the 54 MHz local clock pulse is counted down to provide 27 MHz and 13.5 MHz clock pulses which are used in the logic circuits.

Table 1 shows the frequency compensation count values for the counter 502 in FIG. 5. The counter 502 counts the 13.5 MHz clock pulses for 64 consecutive cycles of the IF waveform in order to measure the actual frequency of the IF waveform. Table 1 shows several columns; the first column is the number of 13.5 MHz clock pulses that have been counted from the beginning of the counting interval for the counter 502. The table goes from 1count all the way up to 505 counts. This is based upon local crystal oscillators at the transmitter and the receiver, each having a frequency of 2.4 GHz for the transmitter ±50 parts per million and 2.4 GHz+2 MHz±50 parts per million. In the worst case, the transmitting crystal oscillator could have its tolerance in the opposite direction from the crystal oscillator at the receiving node and this would result in there being a ±240 KHz tolerance in the difference between the frequencies for the transmitting oscillator and the receiving oscillator. This then would correspond to a counting range of from 378 clock counts for 64 IF cycles, corresponding to a 27.93 microsecond duration for 64 IF cycles, up to 504 clock counts for 37.26 microseconds required to count the 64 IF cycles. The first column of Table 1 is the number of counts of the counter, the second column is the initially-set count applied as the AL count in FIG. 5. If the counter were a 9-bit counter, then 440 counts would correspond to the hexadecimal number 1B8 hex. For an 7-bit counter, the hexadecimal representation is 38 hex. Since the counter 502 is an 7-bit counter, the value of 38 hex is loaded into the counter 502 at the beginning of the counting period. Taking the top three bits in an 7-bit counter as FC0, FC1 and FC2, they would represent a binary value of 3 for a starting count of 440 for the first pulse counted of the 13.5 MHz clock. The third column of Table 1 shows the hexadecimal value for a 9-bit counter, the fourth column shows the hexadecimal representation in an 7-bit counter. The fifth column the value of the binary representation for FC0, FC1 and FC2 and the sixth column represents the time in nanoseconds which is the duration from the beginning of the clock pulse counting. Table 1 shows the progression of the values for these six columns as the number of 13.5 MHz clock pulses increases from 1 up through 378. At the level of the 377 counted clock pulse, the remaining count in the counter 502 is 64 and this corresponds to a hexadecimal representation of 40 for both a 9-bit counter and an 7-bit counter. The corresponding binary value for FC0, FC1 and FC2 would be a value of 4 and this would be at the 27852 nanosecond duration since the beginning of the clock counting period. At this point, the IF frequency is 2.292 MHz and this corresponds to a 27925 nanosecond interval since the beginning of the clocking. Table 1 shows some additional columns. The POS window start value and stop value refer to the latches 712 and 812 in FIGS. 7 and 8. The NEG window start and stop values refer to the latches 714 and 814 in FIGS. 7 and 8. Table 1 shows that the binary value for FC0, FC1 and FC2 will slowly decrease from a value of 4 at 27926 nanoseconds or an IF frequency of 2.292 MHz to 0 at a value of 2.000 MHz. This is the normal or nominal value for the IF frequency. As the IF frequency continues to decrease, at a value of 1.959 MHz, it is seen that the binary value of FC0, FC1 and FC2 goes negative. The negative value continues to negatively increase up to a value of 4 at the lower range for the IF frequency of 1.718 MHz. The values for FC0, FC1 and FC2 are applied as offset values to the counters 702 and 802 in FIGS. 7 and 8, as previously discussed. Thus, it is seen that frequency compensation is accurately imposed by the invention.

A problem occurs with carrier detection when the transmitter is stabilizing its frequency at the beginning of a transmission interval. The transmitter will change its transmission frequency each time there is a frequency hopping event in the network. In addition, the frequency of transmission is different from the local oscillator receiving frequency, and therefore every time a node in the local area network changes from the receiving mode to the transmitting mode, the oscillator frequency must stabilize at the transmitting frequency. During the interval of stabilization of the transmitting frequency, any receiver in the network that detects the presence of the carrier signal being transmitted by the transmitter, risks performing a carrier detection on an unstable signal. This problem is solved by the intentional introduction of a spoiler signal at a transmitter during an initial period when the transmitter is attempting to stabilize a new transmission frequency. Thus, during that initial period of attempted stabilization by the transmitter, any receiver detecting the transmitted carrier signal will not have a successful carrier detection operation. It is only after the transmitter has stabilized its signal that the spoiler signal is removed from modulating the carrier from the transmitter to permit receivers to successfully detect the stabilized transmitted carrier signal.

Figure 13:
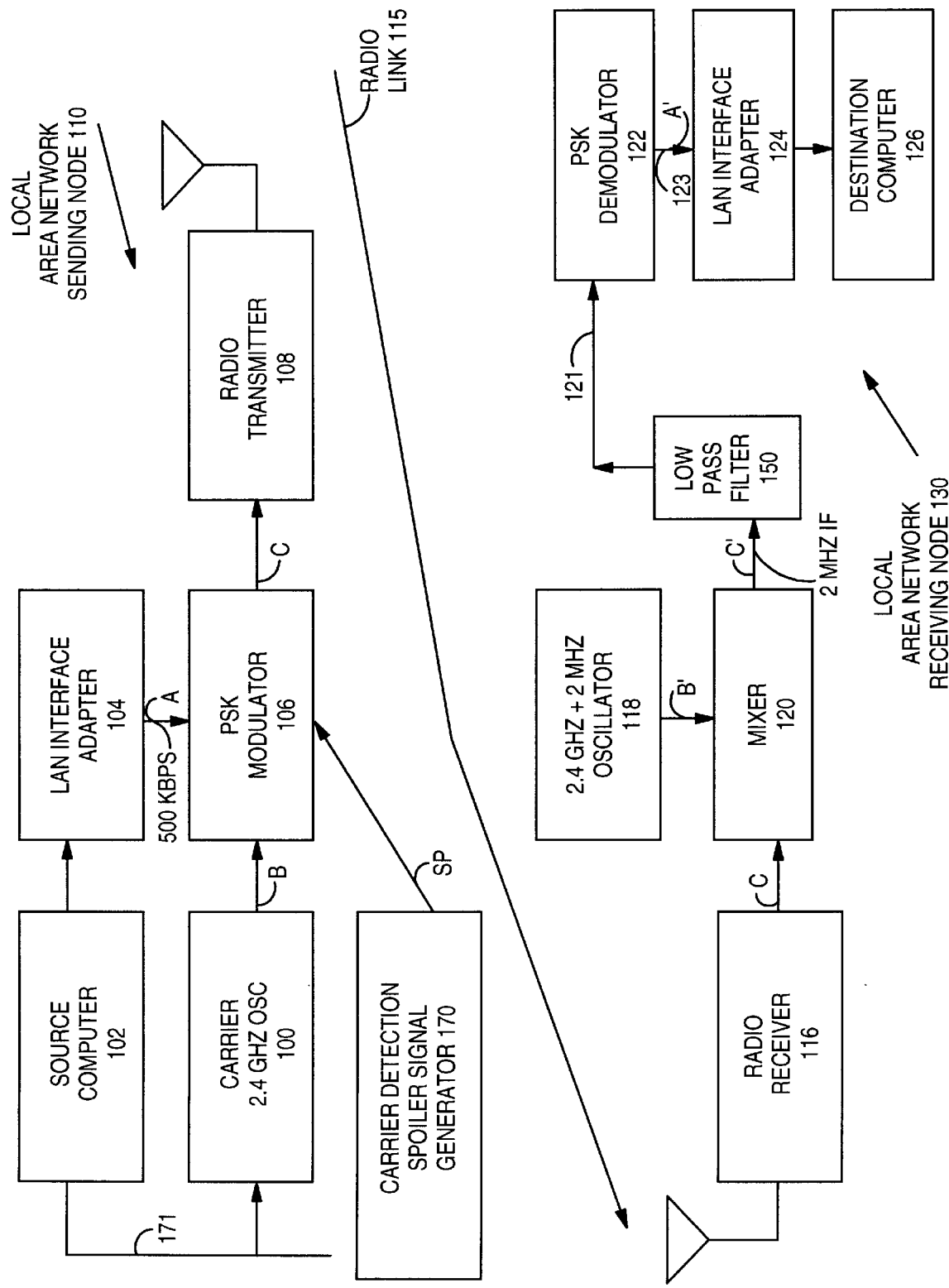
FIG. 13 is a functional block diagram of the local area network, showing the carrier detection spoiler signal generator 170 at the transmitter.

FIG. 13 illustrates the local area network shown in FIG. 2, but with the addition of the carrier detection spoiler signal generator 170 at the transmitter sending node 110. The source computer 102 outputs on line 171 the information as to whether the node is in a transmitting mode or a receiving mode. When the source computer 102 in FIG. 13 begins the transmitting mode, a signal is applied on line 171 to the oscillator 100 to begin the attempt to stabilize the new transmitting frequency. The signal 171 is also applied to the carrier detection spoiler signal generator 170, to start the spoiler signal SP which is applied to the modulator 106.

Figure 14:
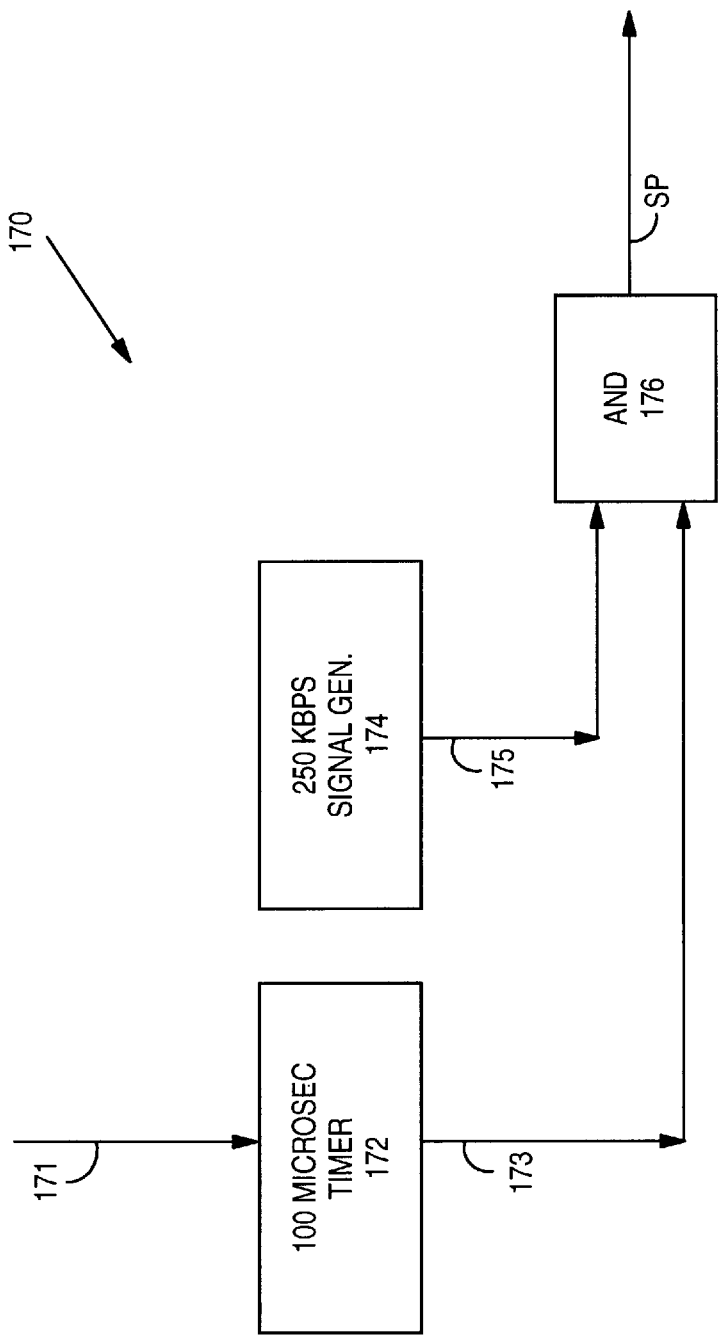
FIG. 14 is a schematic diagram of the carrier detection spoiler signal generator circuit 170.

FIG. 14 shows a more detailed view of the carrier detection spoiler signal generator 170. The start transmission signal 171 is applied to a 100 microsecond timer 172 which turns on the enabling line 173. Also included in the carrier detection spoiler signal generator 170 is a 250 KHz signal generator 174. A 250 Kbps pulse train is output on line 175. Lines 173 and 175 are applied to the AND gate 176, the output of which is the spoiler signal SP. At the instant that the signal on line 171 is applied to the timer 172, the enabling signal 173 is applied to the AND gate 176. For a duration of 100 microseconds, the AND gate 176 is enabled, and passes the 250 KHz pulse train on line 175 out as the spoiler signal SP. The duration of 100 microseconds for the timer 172 was determined from the maximum normal time required for a transmitter oscillator 100 to stabilize at a new transmission frequency. Other values could be chosen for the 100 microsecond timer 172. The 250 KHz signal output on line 175 and passed as the spoiler signal SP to the modulator 106 produces a modulation phase change in the carrier signal C output from the modulator 106. The occurrence of the modulated phase change is once every four IF intermediate frequency intervals which are each 500 nanoseconds long.

Reference to FIG. 15A will show a sequence of the intermediate frequency pulses D which also were shown in FIG. 1A. At the receiver, the mixer 120 mixes the local oscillator 118 signal B' with the received carrier signal C, producing the D waveform. The D waveform shown in FIG. 15A is seen to have a phase modulation occur at every eighth intermediate frequency pulse. As was discussed above, the carrier sensing circuit 400 counts 32 consecutive IF pulses on the waveform D before it outputs the signal CRS indicating that a successful detection of the carrier has been made. In accordance with the invention, by intentionally spoiling the carrier signal C through the intentional introduction of a phase change in one out of eight IF pulses on the waveform D by using the carrier detection spoiler signal generator 170 at the transmitter, the carrier sense circuit 400 at the receiver is not capable of successfully identifying the presence of a carrier. In accordance with the invention, it will not be until 100 microseconds after the beginning of the transmission interval at the transmitter, that the spoiler signal SP will stop modulating the carrier signal being sent to the transmitter to the receiver. Thus, the receiver is prevented from successfully performing a carrier detection operation on the signal transmitted from the transmitter, until 100 microseconds after the transmitter begins its transmission interval, which is sufficient time to enable the transmitter's oscillator 100 to stabilize at the new transmission frequency.

FIG. 15B shows the state of the waveform D after the transmitter has successfully passed its 100 microsecond duration and its transmitting frequency has stabilized. The uniform IF pulses in the waveform D of FIG. 15B will enable the carrier sensing circuit 400 of the receiver to successfully identify the presence of the carrier and output the signal CRS, as described above.

Figure 16:
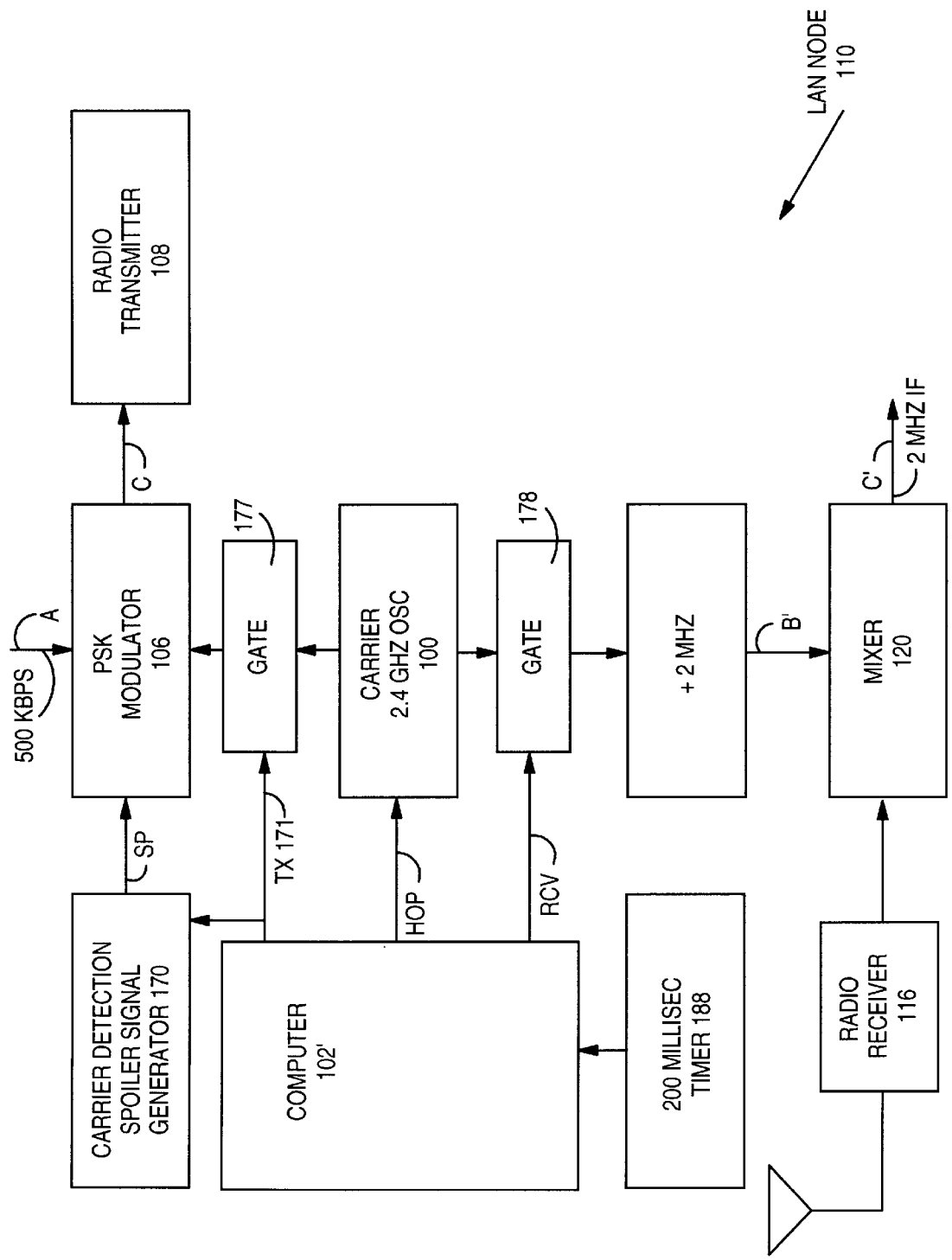
FIG. 16 is a functional block diagram of a complete transmitter/receiver node in the local area network of FIG. 2.

Reference is now made to FIG. 16 which shows a consolidated node in the local area network of FIG. 13, which includes both a transmitter and receiver portion. It is seen in FIG. 16 that a single oscillator 100 is used to generate both the transmission frequency as well as the receiving frequency for the mixer 120. The oscillator frequency from the oscillator 100 is increased by 2 MHz before it is applied to the mixer 120 for receiver operations. A node computer 102' will apply a transmission control signal TX to the gate 177 to apply the 2.4 GHz transmission signal from oscillator 100 to the modulator 106. If the computer 102' is in a receive mode, then it applies a receive control signal RCV to the gate 178 which applies the 2.4 GHz signal plus 2 MHz to the input of the mixer 120.

It is seen in FIG. 16 that the transmit signal TX is applied as a signal on line 171 to the spoiler circuit 170. FIG. 16 also shows a 200 millisecond timer 188 which serves to identify the frequency hopping interval for the network of FIG. 13. In the network of FIG. 13, each sending node and receiving node will cooperatively change its frequency for transmission and reception every 200 milliseconds, in a operation known as frequency hopping. The 200 millisecond timer 188 notifies the computer 102 prime of each new frequency hopping interval.

Figure 17:
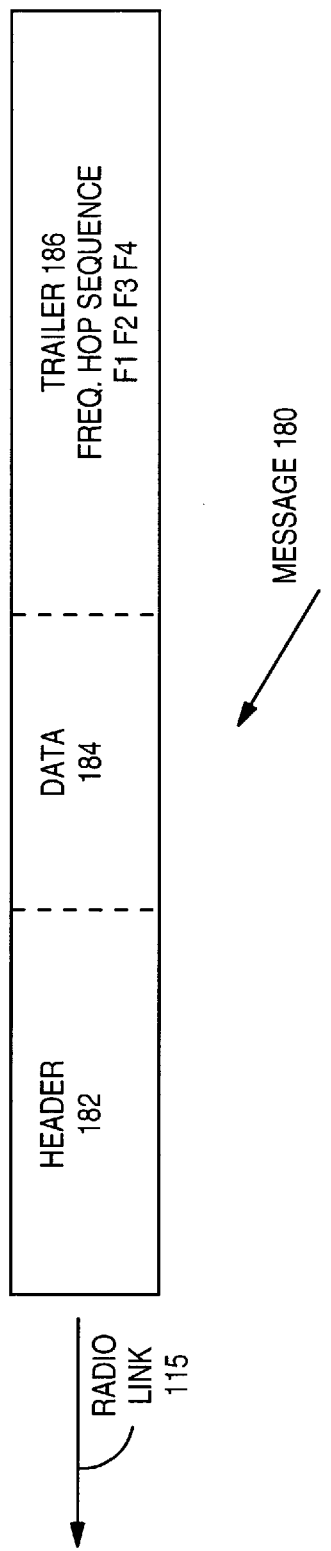
FIG. 17 is an illustration of a message which is transmitted over a radio link, and which includes a trailer portion with a specified frequency hopping sequence.

FIG. 17 shows the format of the message 180 which is transmitted over the radio link 115 in the network shown in FIG. 13. The message 180 includes the header portion 182, the data portion 184, and the trailer portion 186. The message 180 trailer portion 186 includes a frequency hopping sequence F1, F2, F3 and F4. The various communicating nodes in the network of FIG. 13 will broadcast to each other every 200 millisecond frequency hopping interval a new message 180 which identifies the next 4 consecutive frequency hopping frequencies for each of the next 4 frequency hopping intervals that will occur.

Each time a transmitter at a communicating node in the network shown in FIG. 13 either changes its status from receiving to transmitting so that the transmitter must stabilize a new transmission frequency, it will undergo the carrier detection spoiler signal generation operation described above. In addition, every time a communicating node performs a frequency hopping transition at the beginning of a new frequency hopping interval, then the transmitter will begin transmitting at a new frequency which requires stabilization, and therefore the transmitter once again will undergo the carrier detection spoiler signal generation operation described above.

In this manner, receivers in the network of FIG. 13 are prevented from erroneously identifying carrier signals whose frequencies have not yet stabilized.

Table 1 is attached which consists of four pages labeled Table 1(1), Table 1(2), Table 1(3) and Table 1(4).

Although a specific embodiment of the invention has been disclosed, it would be understood by those having skill in the art that changes can be made to that specific embodiment without departing from the spirit and the scope of the invention.

| | COUNTER 502 | | | |
|---|---|---|---|---|
| Counts | Count \|9\| \| Bit\| | Count \|7\| \|Bit\| | FC \|2:0\| \| \| | Time ns |
| 0 | 440 | 1B8 38 | 3 | 0.00 |
| 1 | 439 | 1B7 37 | 3 | 0.00 |
| 2 | 438 | 1B6 36 | 3 | 74.07 |
| 3 | 437 | | | 148.15 |
| 4 | 436 | | | 222.22 |
| 5 | 435 | | | 296.30 |
| 6 | 434 | | | 370.37 |
| 7 | 433 | | | 444.44 |
| 8 | 432 | 1B0 30 | 3 | 518.52 |
| 9 | 431 | 1AF 2F | 2 | 592.59 |
| 10 | 430 | | | 666.67 |
| 11 | 429 | | | 740.74 |
| 12 | 428 | | | 814.81 |
| 13 | 427 | | | 888.89 |
| 14 | 426 | | | 962.96 |
| 15 | 425 | | | 1037.04 |
| 16 | 424 | | | 1111.11 |
| 17 | 423 | | | 1185.19 |
| 18 | 422 | | | 1259.26 |
| 19 | 421 | | | 1333.33 |
| 20 | 420 | | | 1407.41 |
| 21 | 419 | | | 1481.48 |
| 22 | 418 | | | 1555.56 |
| 23 | 417 | | | 1629.63 |
| 24 | 416 | 1A0 20 | 2 | 1703.70 |
| 25 | 415 | 19F 1F | 1 | 1777.78 |
| 26 | 414 | | | 1851.85 |
| 27 | 413 | | | 1925.93 |
| 28 | 412 | | | 2000.00 |
| 29 | 411 | | | 2074.07 |
| 30 | 410 | | | 2148.15 |
| 31 | 409 | | | 2222.22 |
| 32 | 408 | | | 2296.30 |
| 33 | 407 | | | 2370.37 |
| 34 | 406 | | | 2444.44 |
| 35 | 405 | | | 2518.52 |

-continued

| | COUNTER 502 | | | | | | | | |
|---|---|---|---|---|---|---|---|---|---|
| Counts | Count \|9\| Bit | Count \|7\| Bit | FC \|2:0\| | Time ns | | | | | |
| 36 | 404 | | | 2592.59 | | | | | |
| 37 | 403 | | | 2666.67 | | | | | |
| 38 | 402 | | | 2740.74 | | | | | |
| 39 | 401 | | | 2814.61 | | | | | |
| 40 | 400 | 190 | 10 | 1 | 2888.89 | | | | |
| 41 | 399 | 18F | 0F | 0 | 2962.96 | | | | |
| 42 | 398 | | | 3037.04 | | | | | |
| 43 | 397 | | | 3111.11 | | | | | |
| 44 | 396 | | | 3185.19 | | | | | |
| 45 | 395 | | | 3259.26 | | | | | |
| 46 | 394 | | | 3333.33 | | | | | |
| 47 | 393 | | | 3407.41 | | | | | |
| 48 | 392 | | | 3481.48 | | | | | |
| 49 | 391 | 187 | 07 | 0 | 3555.56 | | | | |
| 53 | 387 | 183 | 03 | 0 | 3851.85 | | | | |
| 57 | 383 | 17F | 7F | 7 | 4148.15 | | | | |
| 61 | 379 | 17B | 7B | 7 | 4444.44 | | | | |
| 65 | 375 | 177 | 77 | 7 | 4740.74 | | | | |
| 69 | 371 | | | 5037.04 | | | | | |
| 73 | 367 | 16F | 6F | 6 | 5333.33 | | | | |
| 77 | 363 | | | 5629.63 | | | | | |
| 81 | 359 | | | 5925.93 | | | | | |
| 85 | 355 | | | 6222.22 | | | | | |
| 89 | 353 | 15F | 5F | 5 | 6518.52 | | | | |
| 93 | 347 | | | 6814.81 | | | | | |
| 97 | 343 | | | 7111.11 | | | | | |
| 101 | 339 | | | 7407.41 | | | | | |
| 105 | 335 | 14F | 4F | 4 | 7703.70 | | | | |
| 109 | 331 | | | 8000.00 | | | | | |
| 113 | 327 | | | 8296.30 | | | | | |
| 117 | 323 | | | 8592.59 | | | | | |
| 121 | 319 | 13F | 3F | 3 | 8888.89 | | | | |
| 125 | 315 | | | 9185.19 | | | | | |
| 129 | 311 | | | 9481.46 | | | | | |
| 133 | 307 | | | 9777.78 | | | | | |
| 137 | 303 | 12F | 2F | 2 | 10074.07 | | | | |
| 141 | 299 | | | 10370.31 | | | | | |
| 145 | 295 | | | 10666.67 | | | | | |
| 149 | 291 | | | 10962.96 | | | | | |
| 153 | 287 | 11F | 1F | 1 | 11259.25 | | | | |
| 157 | 283 | | | 11555.56 | | | | | |
| 161 | 279 | | | 11851.85 | | | | | |
| 165 | 275 | | | 12148.15 | | | | | |
| 169 | 271 | 10F | 0F | 0 | 12444.44 | | | | |
| 173 | 267 | | | 12740.74 | | | | | |
| 177 | 263 | | | 13037.04 | | | | | |
| 181 | 259 | | | 13333.33 | | | | | |
| 185 | 255 | 0FF | 7F | 7 | 13829.63 | | | | |
| 189 | 251 | | | 13925.93 | | | | | |
| 193 | 247 | | | 1422.22 | | | | | |
| 197 | 243 | | | 14518.52 | | | | | |
| 201 | 239 | 0EF | 6F | 8 | 14814.81 | | | | |
| 205 | 235 | | | 15111.11 | | | | | |
| 209 | 231 | | | 15407.41 | | | | | |
| 213 | 227 | | | 15703.70 | | | | | |
| 217 | 223 | 0DF | 5F | 5 | 16000.00 | | | | |
| 221 | 219 | | | 16296.30 | | | | | |
| 225 | 215 | | | 16592.59 | IF Freq | | | | |
| 229 | 211 | | | 16886.89 | | | | | |
| 233 | 207 | 0CF | 4F | 4 | 17185.19 | | | | |
| 249 | 191 | | | 18370.37 | 3.484 | | | | |
| 265 | 175 | 0AF | 2F | 2 | 19555.56 | 3.273 | | | |
| 281 | 159 | 09F | 1F | 1 | 20140.74 | 3.086 | | | |
| 297 | 143 | 08F | 0F | 0 | 21925.93 | 2.919 | | | |
| 313 | 127 | 07F | 7F | 7 | 23111.11 | 2.769 | | Pos Window | | Neg Window | |
| 329 | 111 | 06F | 6F | 6 | 24296.30 | 2.634 | | Start | Stop | Start | Stop |
| 345 | 95 | 05F | 5F | 5 | 25481.48 | 2.512 | | | | | |
| 361 | 79 | 04F | 4F | 4 | 26666.67 | 2.400 | | | | | |
| 375 | 65 | 041 | 41 | 4 | 27703.10 | 2.310 | | | | | |
| 376 | 64 | 040 | 40 | 4 | 27777.78 | 2.304 | | | | | |
| 377 | 63 | 03F | 3F | 3 | 21851.85 | 2.298 | <- Max | 148 | 370 | 519 | 741 |
| 379 | 61 | 03D | 3D | 3 | 28000.00 | 2.286 | Comp | 148 | 370 | 519 | 741 |
| 381 | 59 | 03B | 3B | 3 | 28148.15 | 2.274 | | 148 | 370 | 519 | 741 |
| 383 | 57 | 039 | 39 | 3 | 28296.30 | 2.262 | | 148 | 370 | 519 | 741 |

-continued

| COUNTER 502 | | | | | | | | | | |
|---|---|---|---|---|---|---|---|---|---|---|
| Counts | Count \|9\| Bit | Count \|7\| Bit | FC \|2:0\| | Time ns | | | | | | |
| 385 | 55 037 | 37 | 3 | 28444.44 | 2.250 | | 148 | 370 | 519 | 741 |
| 387 | 53 035 | 35 | 3 | 2859.59 | 2.238 | | 148 | 370 | 519 | 741 |
| 389 | 51 033 | 33 | 3 | 28740.74 | 2.227 | | 148 | 370 | 519 | 741 |
| 391 | 49 031 | 31 | 3 | 26888.89 | 2.215 | | 148 | 370 | 519 | 741 |
| 393 | 47 02F | 2F | 2 | 29037.04 | 2.204 | | 167 | 389 | 537 | 759 |
| 395 | 45 02D | 2D | 2 | 29185.19 | 2.193 | | 167 | 389 | 537 | 759 |
| 397 | 43 02B | 2B | 2 | 29333.33 | 2.182 | | 167 | 389 | 537 | 759 |
| 399 | 41 029 | 29 | 2 | 29481.48 | 2.171 | | 167 | 389 | 537 | 759 |
| 401 | 39 027 | 27 | 2 | 29629.63 | 2.160 | | 167 | 389 | 537 | 759 |
| 403 | 37 025 | 25 | 2 | 29777.78 | 2.149 | | 167 | 389 | 537 | 759 |
| 405 | 35 023 | 23 | 2 | 29925.93 | 2.139 | | 167 | 389 | 537 | 759 |
| 407 | 33 021 | 21 | 2 | 30074.07 | 2.128 | | 167 | 389 | 537 | 759 |
| 409 | 31 01F | 1F | 1 | 30222.22 | 2.118 | | 185 | 407 | 556 | 778 |
| 411 | 29 01D | 1D | 1 | 30370.37 | 2.107 | | 185 | 407 | 556 | 778 |
| 413 | 27 01B | 1B | 1 | 30518.52 | 2.097 | | 185 | 407 | 556 | 778 |
| 415 | 25 019 | 19 | 1 | 30666.67 | 2.087 | | 185 | 407 | 556 | 778 |
| 417 | 23 017 | 17 | 1 | 30814.81 | 2.077 | | 185 | 407 | 556 | 778 |
| 419 | 21 015 | 15 | 1 | 30962.96 | 2.067 | | 185 | 407 | 556 | 778 |
| 421 | 19 013 | 13 | 1 | 31111.11 | 2.057 | | 185 | 407 | 556 | 778 |
| 423 | 17 011 | 11 | 1 | 31259.26 | 2.047 | | 185 | 407 | 558 | 778 |
| 425 | 15 00F | 0F | 0 | 31407.41 | 2.038 | | 204 | 426 | 574 | 796 |
| 426 | 14 00E | 0E | 0 | 31481.48 | 2.033 | | 204 | 426 | 574 | 796 |
| 427 | 13 00D | 0D | 0 | 31555.56 | 2.028 | | 204 | 426 | 574 | 796 |
| 428 | 12 00C | 0C | 0 | 31629.63 | 2.023 | | 204 | 426 | 574 | 798 |
| 429 | 11 00B | 0B | 0 | 31703.70 | 2.019 | | 204 | 426 | 574 | 796 |
| 430 | 10 00A | 0A | 0 | 31777.78 | 2.014 | | 204 | 426 | 574 | 796 |
| 431 | 9 009 | 09 | 0 | 31851.85 | 2.009 | | 204 | 126 | 574 | 798 |
| 432 | 8 008 | 08 | 0 | 31925.93 | 2.005 | < Norm | 204 | 426 | 574 | 796 |
| 433 | 7 007 | 07 | 0 | 32000.00 | 2.000 | | 204 | 426 | 574 | 796 |
| 434 | 6 006 | 06 | 0 | 32074.07 | 1.995 | | 204 | 426 | 574 | 796 |
| 435 | 5 005 | 05 | 0 | 32148.15 | 1.991 | | 204 | 426 | 574 | 796 |
| 436 | 4 004 | 04 | 0 | 32222.22 | 1.986 | | 204 | 426 | 574 | 796 |
| 437 | 3 003 | 03 | 0 | 32296.30 | 1.982 | | 204 | 426 | 514 | 798 |
| 438 | 2 002 | 02 | 0 | 32370.37 | 1.977 | | 204 | 426 | 514 | 796 |
| 439 | 1 001 | 01 | 0 | 32444.44 | 1.973 | | 204 | 426 | 574 | 796 |
| 440 | 0 000 | 00 | 0 | 32518.52 | 1.968 | | 204 | 426 | 574 | 796 |
| 441 | −1 1FF | 7F | 7(−1) | 32592.59 | 1.964 | | 222 | 444 | 593 | 815 |
| 443 | −3 1FD | 7D | 7(−1) | 32740.74 | 1.955 | | 222 | 444 | 593 | 815 |
| 445 | −5 1FB | 7B | 7(−1) | 32888.89 | 1.946 | | 222 | 444 | 593 | 815 |
| 447 | −7 1F9 | 79 | 7(−1) | 33037.04 | 1.937 | | 222 | 444 | 593 | 815 |
| 449 | −9 1F7 | 77 | 7(−1) | 33185.19 | 1.929 | | 222 | 444 | 593 | 815 |
| 451 | −11 1F5 | 75 | 7(−1) | 33333.33 | 1.920 | | 222 | 444 | 593 | 815 |
| 453 | −13 1F3 | 73 | 7(−1) | 33481.48 | 1.912 | | 222 | 444 | 593 | 815 |
| 455 | −15 1F1 | 71 | 7(−1) | 33629.63 | 1.903 | | 222 | 444 | 583 | 815 |
| 457 | −17 1EF | 6F | 6(−2) | 33777.78 | 1.895 | | 241 | 483 | 611 | 833 |
| 459 | −19 1ED | 6D | 6(−2) | 33925.93 | 1.886 | | 241 | 463 | 611 | 833 |
| 481 | −21 1EB | 6B | 6(−2) | 34074.07 | 1.878 | | 241 | 463 | 611 | 833 |
| 463 | −23 1E9 | 69 | 6(−2) | 34222.22 | 1.870 | | 241 | 483 | 611 | 833 |
| 485 | −25 1E7 | 67 | 6(−2) | 34370.37 | 1.862 | | 241 | 463 | 611 | 833 |
| 467 | −27 1E5 | 65 | 8(−2) | 34518.52 | 1.854 | | 241 | 463 | 611 | 833 |
| 469 | −90 1E3 | 63 | 6(−2) | 34666.67 | 1.846 | | 241 | 463 | 611 | 833 |
| 471 | −31 1E1 | 61 | 6(−2) | 34814.81 | 1.838 | | 241 | 463 | 611 | 833 |
| 473 | −33 1DF | 5F | 5(−3) | 34962.96 | 1.831 | | 259 | 481 | 630 | 852 |
| 475 | −35 1DD | 5D | 5(−3) | 35111.11 | 1.823 | | 259 | 481 | 630 | 852 |
| 477 | −37 1DB | 5B | 5(−3) | 35259.26 | 1.815 | | 259 | 481 | 630 | 852 |
| 479 | −39 1D9 | 59 | 5(−3) | 35407.41 | 1.808 | | 259 | 481 | 630 | 852 |
| 481 | −41 1D7 | 57 | 5(−3) | 35555.56 | 1.800 | | 259 | 481 | 630 | 852 |
| 483 | −43 1D5 | 55 | 5(−3) | 35703.70 | 1.793 | | 259 | 481 | 630 | 852 |
| 485 | −45 1D3 | 53 | 5(−3) | 35851.85 | 1.785 | | 259 | 481 | 630 | 852 |
| 487 | −47 1D1 | 51 | 5(−3) | 36000.00 | 1.778 | | 259 | 481 | 630 | 652 |
| 489 | −49 1CF | 4F | 4(−4) | 38148.15 | 1.770 | | 278 | 500 | 848 | 870 |
| 491 | −51 1CD | 4D | 4(−4) | 36296.30 | 1.763 | | 278 | 500 | 648 | 370 |
| 493 | −53 1CB | 48 | 4(−4) | 36444.44 | 1.756 | | 278 | 500 | 648 | 870 |
| 495 | −55 1C9 | 49 | 4(−4) | 36592.59 | 1.749 | | 278 | 500 | 648 | 870 |
| 497 | −57 1C7 | 47 | 4(−4) | 36740.74 | 1.742 | | 278 | 500 | 648 | 870 |
| 499 | −59 1C5 | 45 | 4(−4) | 36888.89 | 1.735 | | 278 | 500 | 648 | 870 |
| 501 | −61 1C3 | 43 | 4(−4) | 37037.04 | 1.728 | | 278 | 500 | 648 | 870 |
| 503 | −63 1C1 | 41 | 4(−4) | 37185.19 | 1.721 | <- Max Comp | 278 | 500 | 648 | 870 |
| 505 | −65 1BF | 3F | 3(−5) | 37333.33 | 1.714 | | | | | |

What is claimed is:

1. An apparatus for detecting a carrier signal of a phase shift keyed modulated signal, the apparatus comprising:

an intermediate frequency generator receiving a phase shift keyed modulated signal and generating an intermediate frequency signal, and the intermediate frequency signal having rising edges and a nominal center frequency;

an edge detecting circuit coupled to the intermediate frequency signal and detecting consecutive rising edges of the intermediate frequency signal, two consecutive rising edges representing a time period of a cycle of the intermediate frequency signal;

a first counter circuit responsive to the edge detecting circuit by generating a plurality of counts, each count counted by the first counter circuit being a number of cycles of a reference frequency signal occurring between two consecutive rising edges;

a comparison circuit responsive to the first counter circuit by comparing a first count of reference frequency cycles to a second count of reference frequency cycles when a difference between an initial count of reference frequency cycles and a first predetermined number is less than a second predetermined number, the first predetermined number representing a time period of one cycle of the nominal center frequency, the first count and the second count respectively representing time periods of first and second cycles of a pair of consecutive cycles of the intermediate frequency signal, at least the second count occurring subsequent to the initial count, the comparison circuit generating a difference signal when a difference between the first count and the second count is less than a third predetermined number; and a second counter circuit responsive to the difference signal by counting cycles of the intermediate frequency signal and generating a carrier detect signal when a count of the intermediate frequency signal cycles equals a fourth predetermined number.

2. The apparatus according to claim 1, wherein the comparison circuit compares the first count to the second count when the initial count falls within a predetermined range of numbers, the predetermined range of numbers corresponding to a range of time periods related to one time period of the nominal center frequency.

3. The apparatus according to claim 2, wherein the apparatus is part of a receiving node of a wireless local area network, the receiving node being associated with a sending node of the wireless local area network, the apparatus further comprising a media access control device responsive to the carrier detect signal by disabling the associated sending node from transmitting a signal.

4. The apparatus according to claim 3, wherein the edge detecting circuit includes a limit amplifier generating a square wave pulse signal corresponding to the intermediate frequency signal, the square wave pulse signal having rising edges, and wherein the edge detecting circuit detects the rising edges of the square wave pulse signal.

5. The apparatus according to claim 4, wherein the comparison circuit includes a storage circuit coupled to the first counter circuit and storing the first and second counts representing the respective time periods of the first and second cycles of a pair of consecutive cycles of the intermediate frequency signal;

a decoder circuit coupled to the storage circuit and outputting a first signal when the initial count of cycles is less than the first predetermined number; and an adder circuit coupled to the storage circuit and outputting the difference signal when the difference between the first and second counts is less than the third predetermined number.

6. The apparatus according to claim 5, wherein the second counter circuit is responsive to the first signal by resetting the count of cycles of the intermediate frequency signal.

7. The apparatus according to claim 6, wherein the phase shift keyed modulated signal represents a binary signal, wherein the square wave pulse signal generated by the limit amplifier includes falling edges, and wherein the edge detecting circuit detects consecutive falling edges of the square wave pulse signal, two consecutive falling edges representing a time period of a cycle of the intermediate frequency signal, the apparatus further comprising a third counter circuit responsive to the edge detecting circuit by generating a plurality of counts, each count counted by the third counter circuit being a number of cycles of the reference frequency signal occurring between two consecutive falling edges; and a data output circuit responsive to the respective counts of the first and third counter circuits by generating an output signal that is a composite representation of the binary signal.

8. The apparatus according to claim 7, further comprising a frequency compensation circuit responsive to the second counter circuit by outputting a frequency compensation signal when the second counter circuit generates the carrier detect signal, the frequency compensation signal being related to a difference between a time period of a cycle of the intermediate frequency signal and a time period of one cycle of the nominal center frequency.

9. The apparatus according to claim 8, wherein the first and third counter circuits are coupled to the frequency compensation signal, and wherein the first and third counter circuits each output a plurality of counts that are offset by the frequency compensation signal.

10. The apparatus according to claim 9, wherein the second predetermined number corresponds to about 50 ns, the third predetermined number corresponds to about 36 ns, and the fourth predetermined number corresponds to about 74 cycles of the intermediate frequency signal.

11. The apparatus according to claim 9, wherein after the carrier detect signal is generated, the comparison circuit compares a third count of cycles of the reference frequency counted by the first counter circuit to the first predetermined number, the comparison circuit terminating the difference signal when a difference between the third count and the first predetermined number equals or exceeds a fifth predetermined number; and wherein the second counter circuit is responsive to termination of the difference signal by counting cycles of the intermediate frequency signal and terminating the carrier detect signal when a count of the intermediate frequency signal cycles equals a sixth predetermined number.

12. The apparatus according to claim 11, wherein the fifth predetermined number corresponds to about 55 ns, and the sixth predetermined number corresponds to about 5 cycles of the intermediate frequency signal.

13. The apparatus according to claim 11, wherein the media access control device is responsive to termination of the carrier detect signal by enabling the associated sending node for transmitting a signal.

14. A method of detecting a carrier signal of a phase shift keyed modulated signal, the method comprising the steps of:

generating an intermediate frequency signal from a received phase shift keyed modulated signal, the intermediate frequency signal having a nominal center frequency;

determining a difference between a time period of a first cycle of the intermediate frequency signal and a time period of one cycle of the nominal center frequency;

determining a first difference between cycle time periods of each cycle for each pair of consecutive cycles of the intermediate frequency signal for a first predetermined number of consecutive cycles of the intermediate frequency signal when the determined difference between the time period of the first cycle of the intermediate frequency signal and the time period of one cycle of the nominal center frequency is less than a predetermined period of time, the consecutive cycles being subsequent to the first cycle; and generating a carrier detect signal when the first difference between cycle time periods of each cycle for each pair of the first predetermined number of consecutive cycles of the intermediate frequency is less than a first predetermined cycle time period difference.

15. The method according to claim 14, further comprising the step of disabling transmission of a signal when the carrier detect signal is generated.

16. The method according to claim 14, wherein the step of generating an intermediate frequency signal includes the step of forming a square wave pulse signal from the received signal, the square wave pulse signal having rising and falling edges; and wherein the step of determining the difference between the time period of the first cycle of the intermediate frequency signal and the time period of one cycle of the nominal center frequency includes the steps of:

detecting first and second consecutive rising edges of the square wave pulse signal, the first and second consecutive rising edges representing the first cycle of the intermediate frequency signal;

measuring a first number of periods of a first predetermined frequency signal occurring between the first and second rising edges, the first number representing the time period of the first cycle; and comparing the first number with a predetermined number, the predetermined number representing the time period of one cycle of the nominal center frequency.

17. The method according to claim 16, wherein the step of determining the first difference between cycle time periods of each cycle for each pair of consecutive cycles of the intermediate frequency signal includes the steps of:

detecting third and fourth consecutive rising edges of the square wave pulse signal, the third and fourth consecutive rising edges representing a first cycle of a pair of consecutive cycles of the intermediate frequency signal;

measuring a second number of periods of the first predetermined frequency signal occurring between the third and fourth rising edges, the second number representing the time period of the first cycle of the pair of consecutive cycles;

detecting a fifth rising edge of the square wave pulse signal, the fifth rising edge being consecutive to the fourth rising edge, the fourth and fifth consecutive rising edges representing a second cycle of the pair of consecutive cycles;

measuring a third number of periods of the first predetermined frequency signal occurring between the fourth and fifth rising edges, the third number representing the time period of the second cycle of the pair of consecutive cycles; and determining a difference between the second number and the third number.

18. The method according to claim 17, wherein the first and second rising edges are the third and fourth rising edges, respectively, such that the first cycle of the intermediate frequency signal is the first cycle of the pair of consecutive cycles.

19. The method according to claim 16, wherein the received signal represents a binary signal, the method further comprising the step of demodulating the received signal to generate an output signal that is a composite representation of the binary signal when the carrier detect signal is generated.

20. The method according to claim 19, wherein the step of demodulating the received signal includes the steps of:

measuring first time intervals between consecutive rising edges of the square wave pulse signal;

measuring second time intervals between consecutive falling edges of the square wave pulse signal; and generating the output signal based on results of the first and second time interval measurements.

21. The method according to claim 20, further comprising the steps of:

measuring a cycle time period of a second cycle of the intermediate frequency signal when the cycle time period difference for each pair of the first predetermined number of consecutive cycles is less than the first predetermined cycle time period difference, the second cycle being subsequent to the first predetermined number of consecutive cycles;

generating a frequency compensation factor based on the measured second cycle time period; and compensating the first and second time intervals measurements for cycle time period deviations of the intermediate frequency signal from the cycle time period of the nominal center frequency using the frequency compensation factor.

22. The method according to claim 21, wherein the first predetermined number of corresponds to 74 consecutive cycles, the predetermined period of time is about 50 ns, and the first predetermined cycle time period difference is about 36 ns.

23. The method according to claim 21, further comprising the steps of:

determining a second difference between cycle time periods of each cycle for each pair of consecutive cycles of the intermediate frequency signal for a second predetermined number of consecutive cycles of the intermediate frequency signal after the carrier detect signal is generated; and terminating the carrier detect signal when the second difference between cycle time periods of each cycle for each pair of the second predetermined number of consecutive cycles of the intermediate frequency is less than a second predetermined cycle time period difference.

24. The method according to claim 23, wherein the second predetermined number of consecutive cycles is about 5, and the second predetermined cycle time period difference is about 55 ns.

25. A wireless local area network comprising:
a first node having a transmitting device transmitting a phase shift keyed modulated signal; and
a second node having a transmitting device and a receiving device, the receiving device receiving the signal, the receiving device including,
an intermediate frequency generator generating an intermediate frequency signal corresponding to the signal;
a carrier detection circuit coupled to the intermediate frequency generator and measuring a time period of a cycle of the intermediate frequency signal and generating a first detection signal when a difference between the measured time period and a nominal time period of the intermediate frequency signal is less than a first predetermined difference;
a cycle-to-cycle difference circuit measuring a difference in time periods of two consecutive cycles of the intermediate frequency signal and generating a valid difference signal when the difference is less than a second predetermined difference; and
a cycle difference counter circuit responsive to the first detection signal and the valid difference signal by counting cycles of the intermediate frequency signal and generating a carrier detect signal when a count of the intermediate frequency signal cycles equals a first predetermined number.

26. The wireless network according to claim 25, wherein the receiving device further comprises a media access control device responsive to the carrier detect signal by disabling the transmitting device of the second node from transmitting a signal.

27. The wireless network according to claim 26, wherein the carrier detection circuit includes a memory circuit storing measured time periods of two consecutive cycles of the intermediate frequency signal, and a decoder circuit generating the first detection signal when the difference between one of the stored measured time periods and the nominal time period of the intermediate frequency signal is less than the first predetermined difference; and
wherein the cycle-to-cycle difference circuit includes an adder circuit coupled to the memory circuit and outputting the valid difference signal when the difference between the two stored measured time periods is less than the second predetermined difference.

28. The wireless network according to claim 27, wherein the decoder circuit terminating the first detection signal when the difference between the one of the stored measured time periods and the nominal time period of the intermediate frequency signal equals or exceeds the first predetermined difference, and
wherein the cycle difference counter circuit is responsive to termination of the first detection signal by setting the count of the cycles of the intermediate frequency signal.

29. The wireless network according to claim 28, wherein the phase shift keyed modulated signal represents a binary signal, and
wherein the receiving device further includes a demodulator circuit generating a composite output signal corresponding to the binary signal when the carrier detect signal is generated.

30. The wireless network according to claim 29, wherein the receiving device further includes a frequency compensation circuit responsive to the carrier detect signal by generating a frequency compensation signal, the frequency compensation signal being related to a difference between a time period of a cycle of the intermediate frequency signal and a time period of one cycle of the nominal center frequency.

31. The wireless according to claim 30, wherein the memory circuit is coupled to the frequency compensation signal, and the measured time periods of the two consecutive cycles of the intermediate frequency signal are compensated by the frequency compensation signal.

32. The wireless network according to claim 31, wherein the first predetermined number corresponds to about 50 ns, the second predetermined number corresponds to about 36 ns, and the first predetermined number corresponds to about 74 cycles of the intermediate frequency signal.

33. The wireless network according to claim 31, wherein after the carrier detect signal is generated, the cycle difference counter circuit measures a difference between a time period of a cycle of the intermediate frequency signal and the nominal time period of the intermediate frequency signal, and generates a valid difference signal when the difference is less than a third predetermined difference and terminates the valid difference signal when the difference equals or exceeds the third predetermined difference; and
wherein the cycle difference counter circuit is responsive to termination of the valid difference signal by counting cycles of the intermediate frequency signal and terminating the carrier detect signal when a count of the intermediate frequency signal cycles equals a second predetermined number.

34. The wireless network according to claim 33, wherein the third predetermined difference corresponds to about 55 ns, and the second predetermined number corresponds to about 5 cycles of the intermediate frequency signal.

35. The wireless network according to claim 33, wherein the media access control device is responsive to termination of the carrier detect signal by enabling the transmitting device of the second node for transmitting a signal.

* * * * *